United States Patent
Nakao et al.

(10) Patent No.: US 8,102,465 B2
(45) Date of Patent: Jan. 24, 2012

(54) PHOTOGRAPHING APPARATUS AND PHOTOGRAPHING METHOD FOR PHOTOGRAPHING AN IMAGE BY CONTROLLING LIGHT IRRADIATION ON A SUBJECT

(75) Inventors: Soichiro Nakao, Asaka (JP); Toshiharu Ueno, Asaka (JP); Takao Nakanishi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 990 days.

(21) Appl. No.: 11/979,610

(22) Filed: Nov. 6, 2007

(65) Prior Publication Data

US 2008/0106637 A1 May 8, 2008

(30) Foreign Application Priority Data

Nov. 7, 2006 (JP) .................................. 2006-301710
Nov. 16, 2006 (JP) .................................. 2006-309978
Oct. 18, 2007 (JP) .................................. 2007-271203

(51) Int. Cl.
*H04N 5/222* (2006.01)

(52) U.S. Cl. ........................................ 348/370; 348/371

(58) Field of Classification Search .................. 348/349, 348/357, 370, 371
See application file for complete search history.

(56) References Cited

U.S. PATENT DOCUMENTS

| | | | | |
|---|---|---|---|---|
| 5,347,339 | A | * | 9/1994 | Terada et al. ................ 396/62 |
| 6,826,364 | B2 | * | 11/2004 | Kawasaki et al. ............ 396/157 |
| 7,551,848 | B2 | * | 6/2009 | Lee et al. .................... 396/157 |
| 2005/0099529 | A1 | * | 5/2005 | Hattori ........................ 348/370 |
| 2006/0055818 | A1 | * | 3/2006 | Hwang ........................ 348/371 |
| 2007/0030675 | A1 | * | 2/2007 | Oon et al. .................... 362/237 |
| 2007/0263935 | A1 | * | 11/2007 | Sanno et al. ................ 382/190 |
| 2009/0073275 | A1 | | 3/2009 | Awazu |

FOREIGN PATENT DOCUMENTS

| | | |
|---|---|---|
| JP | 2004-317699 A | 11/2004 |
| JP | 2006-23131 A | 1/2006 |
| JP | 2006-227380 A | 8/2006 |
| JP | 2003-98579 A | 4/2007 |
| JP | 4115467 B2 | 4/2008 |
| JP | 2008-129082 A | 6/2008 |

* cited by examiner

*Primary Examiner* — Kelly L Jerabek
(74) *Attorney, Agent, or Firm* — Birch, Stewart, Kolasch & Birch, LLP

(57) ABSTRACT

A photographing apparatus including: an imaging unit for obtaining image data by imaging a subject; a light irradiation unit for irradiating light onto the subject when photographing; an eye detection unit for detecting a human or animal eye; and a light control unit for changing the irradiation condition of the light such that the light is irradiated on a position of the subject other than the eye detected by the eye detection unit.

8 Claims, 21 Drawing Sheets

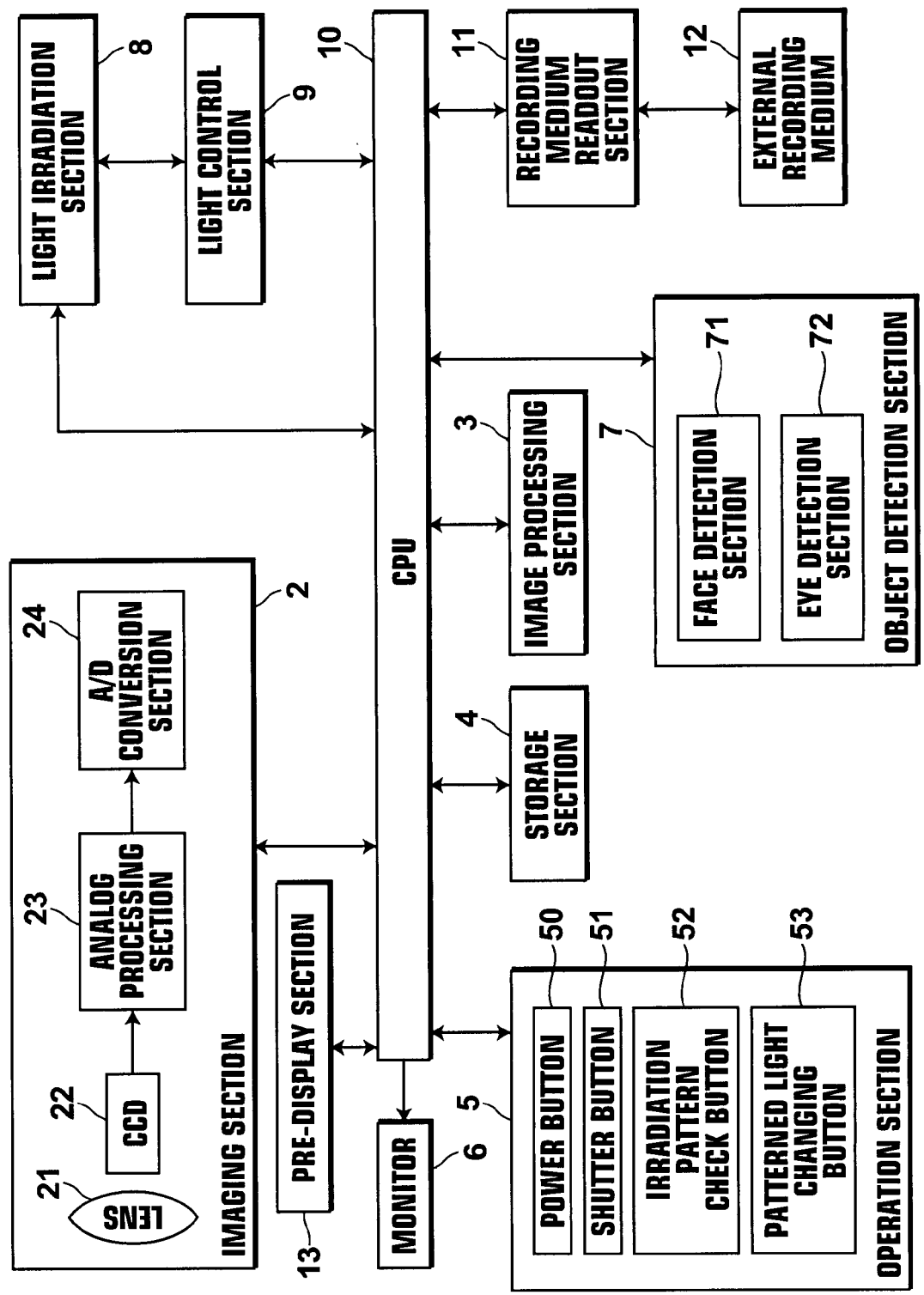

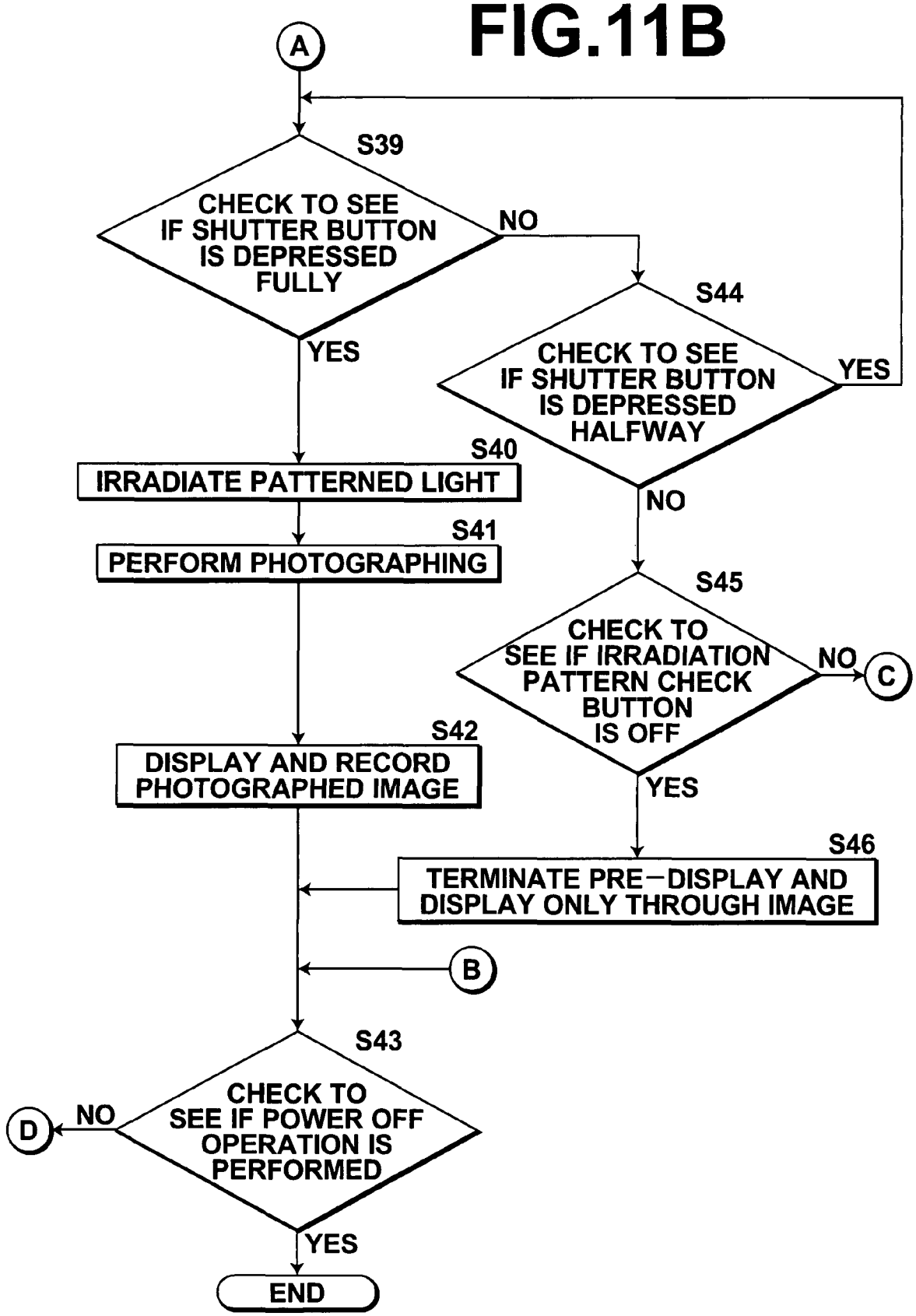

PHOTOGRAPHING APPARATUS AND PHOTOGRAPHING METHOD FOR PHOTOGRAPHING AN IMAGE BY CONTROLLING LIGHT IRRADIATION ON A SUBJECT

BACKGROUND OF THE INVENTION

1. Field of the Invention

The present invention relates to a photographing apparatus, such as a digital camera, and, in particular, to a photographing apparatus and method in which light is irradiated onto a subject.

2. Description of the Related Art

Recently, various methods for measuring a three-dimensional shape of a predetermined object using a photographing apparatus, such as a digital camera, have been proposed. One of the methods is a stereo matching method in which a predetermined object is imaged from different directions using a plurality or a single photographing apparatus to obtain a plurality of sets of image data, then a commonly imaged point in each set of image data (reference point) is identified, and distances to the reference point are measured according to the triangulation principle to estimate the three-dimensional shape of the predetermined object. The methods for identifying the reference point include a method in which a characteristic point of the predetermined object within the image data is visually specified by a person, a method in which patterned light, such as spot light or slit light, is irradiated on the predetermined object when photographing and a spot produced by the spot beam or a straight line produced by the slit beam is used as the reference point, or the like.

Another method for measuring a three-dimensional shape is also known as described, for example, in Japanese Unexamined Patent Publication No. 2006-023131, in which specifically patterned light is irradiated onto a subject when photographing and a predetermined object is photographed from the same direction as the optical axis of the patterned light and from a direction different from the optical axis to obtain image data of the predetermined object, and the shape of the predetermined object is estimated by analyzing the variation in the shape within the obtained image data, such as the distortion of the patterned light or the like.

In the mean time, digital cameras using CMOS or CCD image sensors are provided as generally available photographing devices. In the digital cameras using such type of image sensors, it is common to perform focus control of the taking lens while evaluating the formation of a subject image on the image sensor. In the evaluation of the image formation, an image signal obtained from each pixel of the image sensor is used, and the focus control of the taking lens is performed, for example, such that the evaluation value which is the integrated value of difference in the signal level between adjacent pixels becomes maximum. Another method is also known as described, for example, in Japanese Unexamined Patent Publication No. 2004-317699, in which a region corresponding to the face portion of a person is specified within a subject image, and the focus control is performed using the face portion of the subject.

When focus control of the taking lens is performed based the image signals from the image sensor in the manner as described above, it is often the case that the focus control is not performed properly under photographing conditions in which the overall subject brightness is reduced, such as during the nighttime or in a dark place, since the contrast of the subject itself becomes low. Under such circumstances, a method is proposed as described, for example, in Japanese Unexamined Patent Publication No. 2003-098579, in which an auxiliary light projector is provided in a camera body, and auxiliary light is irradiated onto a subject when focus control of the taking lens is performed. The irradiation of the auxiliary light onto the subject increases the subject brightness, and thereby the focus control of the taking lens may be performed properly.

In the method for photographing a predetermined object by irradiating patterned light as described above, however, the beam may sometimes be irradiated also on an area of the subject which does not want the beam to be irradiated. For example, when measuring the three-dimensional shape of a human face, the beam forming the reference point may be irradiated onto the eyes of the person, which poses a problem that the person is dazzled.

Further, in the case of a digital camera in which the focus control is performed using the face portion of a person or the like, the auxiliary light is naturally irradiated on the face portion, and the auxiliary light may enter into the eyes of the person so that it has a disadvantage that the person is caused to feel dazzled.

The present invention has been developed in view of the circumstances described above, and it is an object of the present invention to provide a photographing apparatus and method capable of not causing a subject to feel dazzled by the light irradiated when photographing.

SUMMARY OF THE INVENTION

A photographing apparatus according to the present invention includes:

an imaging unit for obtaining image data by imaging a subject;

a light irradiation unit for irradiating light onto the subject when photographing;

an eye detection unit for detecting a human or animal eye; and a light control unit for changing the irradiation condition of the light such that the light is irradiated on a position of the subject other than the eye detected by the eye detection unit.

In the photographing apparatus described above, the light irradiation unit may be a unit for irradiating measuring light for measuring the distance to each portion of the subject.

Another photographing apparatus according to the present invention includes:

an imaging unit for obtaining image data by imaging a subject;

a light irradiation unit for irradiating patterned light for three-dimensional shape measurement onto the subject when photographing;

an eye detection unit for detecting a human or animal eye; and a light control unit for changing the irradiation condition of the patterned light such that the patterned light is irradiated on a position of the subject other than the eye detected by the eye detection unit.

The referent of "irradiation condition" as used herein means a condition for determining the irradiation range, irradiation position, or patterned shape of the light.

Still another photographing apparatus according to the present invention a photographing apparatus in which subject image light is inputted to an image sensor through a taking lens, and image signals obtained through photoelectric conversion by the image sensor are stored after converted to digital data, the apparatus including:

a face image position identification unit for detecting a human or animal face image within the subject image based on the digital data, and identifying the position of the face image;

an eye position identification unit for identifying an eye position from the face image identified by the face image position identification unit;

an auxiliary light irradiation unit for irradiating narrow-angle auxiliary light onto a position within an area including the face image identified by the face image position identification unit other than the eye position; and a focus control unit for controlling the focus of the taking lens by identifying the in-focus position based on the digital data of the area including the face image.

In the photographing apparatus described above, the auxiliary light irradiation unit may include: a light source which is activated when controlling the focus of the taking lens; a narrow-angle lens for turning the light from the light source into narrow-angle auxiliary light; and an irradiation direction control section for controlling the irradiation direction of the narrow-angle auxiliary light by moving either the light source or the narrow-angle lens on a plane substantially orthogonal to the photographing optical axis.

Further, in the photographing apparatus described above, the auxiliary light irradiation unit may include an auxiliary light irradiation angle changing section for changing the irradiation angle of the light from the light source to turn the light into wide-angle auxiliary light; and the wide-angle auxiliary light is irradiated onto the subject by the auxiliary light irradiation angle changing section when the face image position identification unit is unable to detect a face image.

Still further, in the photographing apparatus described above, the auxiliary light irradiation angle changing section may include: a wide-angle lens for irradiating the light from the light source as the wide-angle auxiliary light; and a lens moving section for selectively positioning the narrow-angle lens or the wide-angle lens on the optical axis of the light source.

Further, in the photographing apparatus described above, the auxiliary light irradiation angle changing section may include a moving section for moving either the light source or the narrow-angle lens on the photographing optical axis.

Still further, in the photographing apparatus described above, the narrow-angle lens may be constituted by a zoom lens, and the auxiliary light irradiation angle changing section may be constituted by a zoom magnification changing unit for changing the zoom magnification of the narrow-angle lens.

Further, in the photographing apparatus described above, when the face image position identification unit is unable to detect a face image while the wide-angle auxiliary light is irradiated by the auxiliary light irradiation unit, the auxiliary light irradiation unit may irradiate narrow-angle auxiliary light onto a predetermined position.

Still further, in the photographing apparatus described above, while the focus control of the taking lens is performed by irradiating narrow-angle auxiliary light by the auxiliary light irradiation unit, the eye position identification unit may identify the eye position, and the irradiation direction of the narrow-angle auxiliary light may be changed to avoid the eye position identified by the eye position identification unit.

A photographing method according to the present invention is a method for photographing a subject by irradiating patterned light for three-dimensional shape measurement onto the subject when photographing, the method including the steps of:

detecting a human or animal eye from image data obtained by imaging the subject; and changing the irradiation condition of the patterned light such that the patterned light is irradiated on a position of the subject other than the detected eye.

Another photographing method according to the present invention is a method in which subject image light is inputted to an image sensor through a taking lens, and image signals obtained through photoelectric conversion by the image sensor are stored after converted to digital data, the method including the steps of:

a face image position identification step for detecting a human or animal face image within the subject image based on the digital data, and identifying the position of the face image;

an eye position identification step for identifying an eye position from the face image identified by the face image position identification step;

an auxiliary light irradiation step for irradiating narrow-angle auxiliary light onto a position within an area including the face image identified by the face image position identification step other than the eye position; and a focus control step for controlling the focus of the taking lens by identifying the in-focus position based on the digital data of the area including the face image.

According to a photographing apparatus and method of the present invention, an eye is detected from image data, and the irradiation condition of the light is changed such that the light is irradiated on a position of the subject other than the detected eye, so that the light is prevented from being irradiated on the eye, and the person is prevented from feeling dazzled.

Further, according to another photographing apparatus and method, when focus control of the taking lens is performed during the nighttime or in a dark place, the position of a human or animal eye is identified, and auxiliary light is irradiated onto a position other than the identified position of the human or animal eye, so that the auxiliary light irradiated when focus control of the taking lens is performed is prevented from entering the eye of the human or animal subject. This prevents the human or animal subject from feeling dazzled.

Still further, when a human or animal face image is unable to be detected, wide-angle auxiliary light is irradiated, so that the position of a human or animal eye is invariably identified. This allows narrow-angle auxiliary light to be irradiated onto a position other than the identified position of the eye, thereby the focus control of the taking lens may be performed with respect to the human or animal within the subject image.

Further, when a human or animal face image is not identified while the wide-angle auxiliary light is irradiated onto the subject, the narrow-angle auxiliary light is irradiated on a predetermined position, such as the central area of the field angle, so that even in the photographing of a landscape, without a human or an animal included therein, during the nighttime or in a dark place, the focus control of the taking lens may be performed.

Still further, the identification of the position of the eye is also performed while the focus control is performed by irradiating the narrow-angle auxiliary light, so that even if the number of humans or animals is increased or if the position of the human or animal is changed in the middle of the photographing, the position of the human or animal eye may be invariably identified. This allows the narrow-angle auxiliary light to be irradiated onto a position other than the identified position of the human or animal eye, so that the focus control of the taking lens may be performed with respect to the human or animal subject.

BRIEF DESCRIPTION OF THE DRAWINGS

FIG. 9 is a block diagram of the digital camera according to another alternative embodiment, schematically illustrating the structure thereof.

FIG. 11B is a flowchart of a photographing process of the digital camera shown in FIG. 9 (Part 2).

DESCRIPTION OF THE PREFERRED EMBODIMENTS

Figure 1:
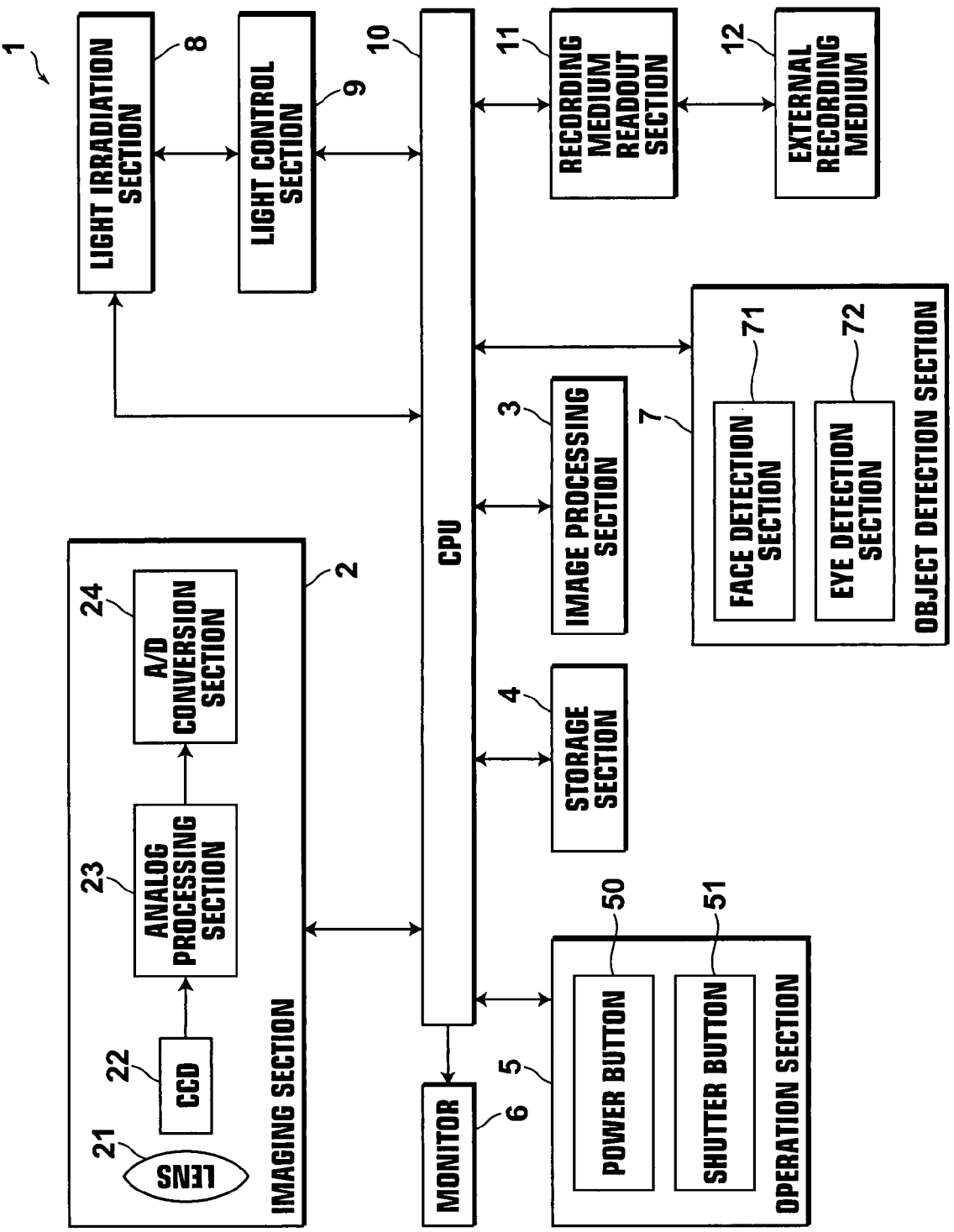
FIG. 1 is a block diagram of the digital camera according to a first embodiment, schematically illustrating the structure thereof.

Hereinafter, the photographing apparatus according to a first embodiment of the present invention will be described in detail with reference to the accompanying drawings. In the following embodiments, description will be made of a case in which a digital camera having light irradiation unit is described as the photographing apparatus of the present invention, but the invention is not limited to this, and the invention is applicable to other electronic devices having an electronic photographing function with light irradiation unit, such as digital video cameras, camera phones, PDAs with a built-in camera, and the like. FIG. 1 is a block diagram of the digital camera 1 according to the present embodiment, schematically illustrating the structure thereof.

The digital camera 1 of the present embodiment includes a CPU 10, an imaging section (imaging unit) 2, an image processing section 3, a storage section 4, an operation section 5, a liquid crystal monitor (display unit) 6, an object detection section (object detection unit) 7, a light irradiation section (light irradiation unit) 8, a light control section (light control unit) 9, and a recording medium readout section 11, as illustrated in FIG. 1.

The CPU 10 performs overall control of the digital camera 1 based on the input from the operation section 5. It also serves as a readout section for reading out data stored in the storage section 4, an operation control section for controlling zooming of a lens drive section, to be described later, focus (AF), and auto exposure (AE), and a display control section for controlling the display of the liquid crystal monitor 6.

The liquid crystal monitor 6 displays an image recorded on an external recording medium 12, a menu screen for performing various settings, and a through image which is image information obtained by a CCD 22 when photographing, and the like.

The imaging section 2 includes a taking lens 21, a not shown lens drive section, the CCD 22 as the image sensor, a not shown CCD drive section, an analog processing section 23, an A/D conversion section 24, and the like. The subject image formed on the light receiving surface of the CCD 22 through the taking lens 21 is converted to signal charges by each sensor of the CCD 22 according to the inputted amount of light. The CCD 22 has a so-called electronic shutter function in which the charge storage time (shutter speed) of each sensor is controlled by the timing of the shutter gate pulse.

The signal charges stored in the respective sensors are sequentially read out from the CCD 22 as voltage signals (analog image signals) based on the pulses supplied from the CCD drive section. The analog image signals outputted from the CCD 22 are sent to the analog processing section 23.

The analog processing section 23 includes signal processing circuits, such as a sample-and-hold circuit, a color separation circuit, a gain control circuit, and the like. In the analog processing section 23, a correlated double sampling and color separation into R, G, B signals are performed, and the level of each color signal is corrected (white balance correction).

The signals outputted from the analog processing section 23 are converted to digital signals by the A/D conversion section 24 and sent to the image processing section 3. The CCD drive section, analog processing section 23, and A/D conversion section 24 are driven in synchronization with a timing signal supplied from a timing generator according to an instruction from the CPU 10.

The image processing section 3 includes a digital signal processor (DSP) having image quality correction circuits, such as a brightness/color difference signal generation circuit, gamma correction circuit, sharpness correction circuit, contrast correction circuit, white balance correction circuit, and the like. It processes the image signals according to the setting values of image quality correction parameters stored in the storage section 4 and read out therefrom based on an instruction from the CPU 10.

The storage section 4 is a recording medium capable of storing various data, such as a magnetic or optical recording medium, a semiconductor memory, or the like. The storage section 4 includes therein a system program for operating the digital camera, and stores the processed image data. When displaying the obtained image, the image data stored in the storage section 4 are read out according to an instruction from the CPU 10 and outputted to the display control section (CPU 10).

The image data sent to the display control section are converted to a predetermined signal system for display (e.g., NTSC color composite image signal) and outputted to the liquid crystal monitor 6. In this way, the image represented by the image data is displayed on the screen of the liquid crystal monitor 6.

The processed image data stored in the storage section 4 are regularly overwritten by the image data outputted from the CCD 22 and processed by the image processing section 3, and video signals generated from the image data are supplied to the liquid crystal monitor 6, thereby the image inputted from the CCD 22 is displayed on the liquid crystal monitor 6 in real time. The user may confirm the subject image by the image (through image) displayed on the liquid crystal monitor 6.

The operation section 5 includes an input section having buttons for performing various settings and giving instructions, such as a power button 50, a shutter button 51, and the like. When the user obtains a desired subject image and gives an instruction to record the image through the shutter button 51, the image data stored in the storage section 4 at that time are compressed in a predetermined format, such as in JPEG format, by a not shown compression/expansion circuit, and recorded on the external recording medium 12 through the recording medium readout section 11.

As for the external recording medium 12, xD PictureCard (registered trademark), SmartMedia (registered trademark), a PC card, CompactFlash (registered trademark), a magnetic disk, an optical disk, a magnetic optical disk, MemoryStick (registered trademark), or the like may be used. That is, various recording media capable of reading/writing according to the electronic, magnetic, or optical system, or a combination thereof may be used. Here, a signal processing unit and an interface appropriate for the medium used are applied. Further, the unit for storing images are not limited to recording media detachably attachable to the digital camera 1, and it may be the storage section 4 provided in the body of the digital camera 1.

The object detection section 7 is a section for detecting a predetermined object from the image data stored in the storage section 4. In the present embodiment, the object detection section 7 includes a face detection section 71 assuming that the predetermined object is a face, and an eye detection section 72 assuming that the predetermined object is an eye. The face detection section 71 detects a region included in a face having a face characteristic (e.g., region having flesh color, region having an eye, region having face shape, or the like) as a face region, and the eye detection section 72 detects an eye from the detected face region, and they calculate data, such as the size, position, shape, and the like of the detected objects respectively. As for the face detection process, any known method such as, for example, the method described in Japanese Unexamined Patent Publication No. 2005-242640 may be used.

Figure 2:
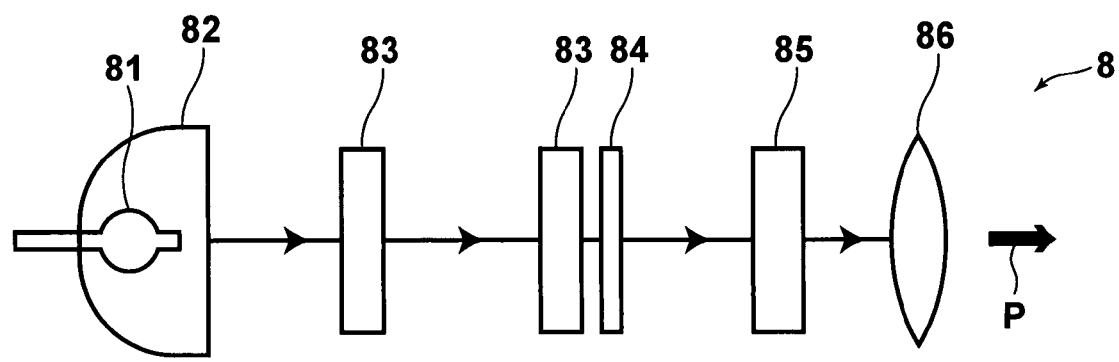
FIG. 2 is a structural diagram of the light irradiation section shown in FIG. 1.

The light irradiation section 8 is a section for irradiating patterned light P for three-dimensional shape measurement onto a subject. A schematic structure of the light irradiation section 8 according to an embodiment is illustrated in FIG. 2. The light irradiation section 8 of the present embodiment is a section that illuminates a liquid crystal panel with a light beam outputted from a monochromatic light source, and projects an image displayed on the liquid crystal panel onto a subject. As illustrated in FIG. 2, the light irradiation section 8 includes: a light source 81 which is, for example, an extra high pressure mercury lamp, a metal halide lamp, or the like having high intensity with high emission efficiency; an elliptical mirror 82 (or parabolic mirror) for reflecting the light outputted from the light source 81; two integrator lenses 83 for realizing uniform illumination by splitting and combining the light beam; a polarization conversion element 84 for linearly polarizing the light in the same direction; a liquid crystal panel 85 constituted by a device having liquid crystal and a polarization film sandwiched between two transparent plates, and displays an irradiation pattern of patterned light P by controlling the transmittance of each pixel using the liquid crystal; and a projection lens 86 for enlargedly projecting the image, i.e. the patterned light P, onto the subject. That is, the light irradiation section 8 illuminates the liquid crystal panel 85 with a light beam generated by the light source 81, and irradiates an image displayed on the liquid crystal panel 85, i.e. the patterned light P, onto the subject.

The patterned light P according to the present embodiment includes triangle-shaped grid points disposed two-dimensionally (FIG. 5D), but various different shapes are possible, including circular or rectangular grid points, grid lines, concentric circles, or the like, and the shape data may be stored in the storage section 4. Further, the light irradiation section 8 of the present embodiment is a section that irradiates the patterned monochromatic light P, but the present invention is not limited to this. For example, it may be a section that irradiates patterned color light in combination with three colors of red (R), green (G), and blue (B). In this case, any known device, such as a three plate liquid crystal projector or the like may be used.

Further, when the light irradiation section 8 is a section that irradiates the patterned color light described above, the color of the patterned light is made changeable according to the object to which the patterned light is irradiated in order to clearly indicate the patterned light on the image to be obtained. For example, when the patterned light is irradiated onto a human face, patterned light of blue, green, or the like is irradiated.

The light control section 9 is a section that changes the irradiation condition of the patterned light P according to the detection result of the object detection section 7. In the present embodiment, the range, position, shape, or the like of the patterned light displayed on the liquid crystal panel 85 is changed to control an area to which the patterned light P is irradiated and an area to which the patterned light P is not irradiated. Here, in order to specify the light irradiation section, control is performed such that the irradiation range of the light irradiation section 8 and photographing field of the imaging section 2 invariably correspond with each other.

In this case, an arrangement may be adopted in which the shape or position of the patterned light P is changed by changing the irradiation shape or position of the patterned light on the liquid crystal panel, which is changed by selecting and reading out one of a plurality of shape data sets stored in the storage section 4 and changing the image displayed on the liquid crystal panel 85 according to the readout shape data. The digital camera 1 of the present embodiment is structured in the manner as described above.

Figure 3:
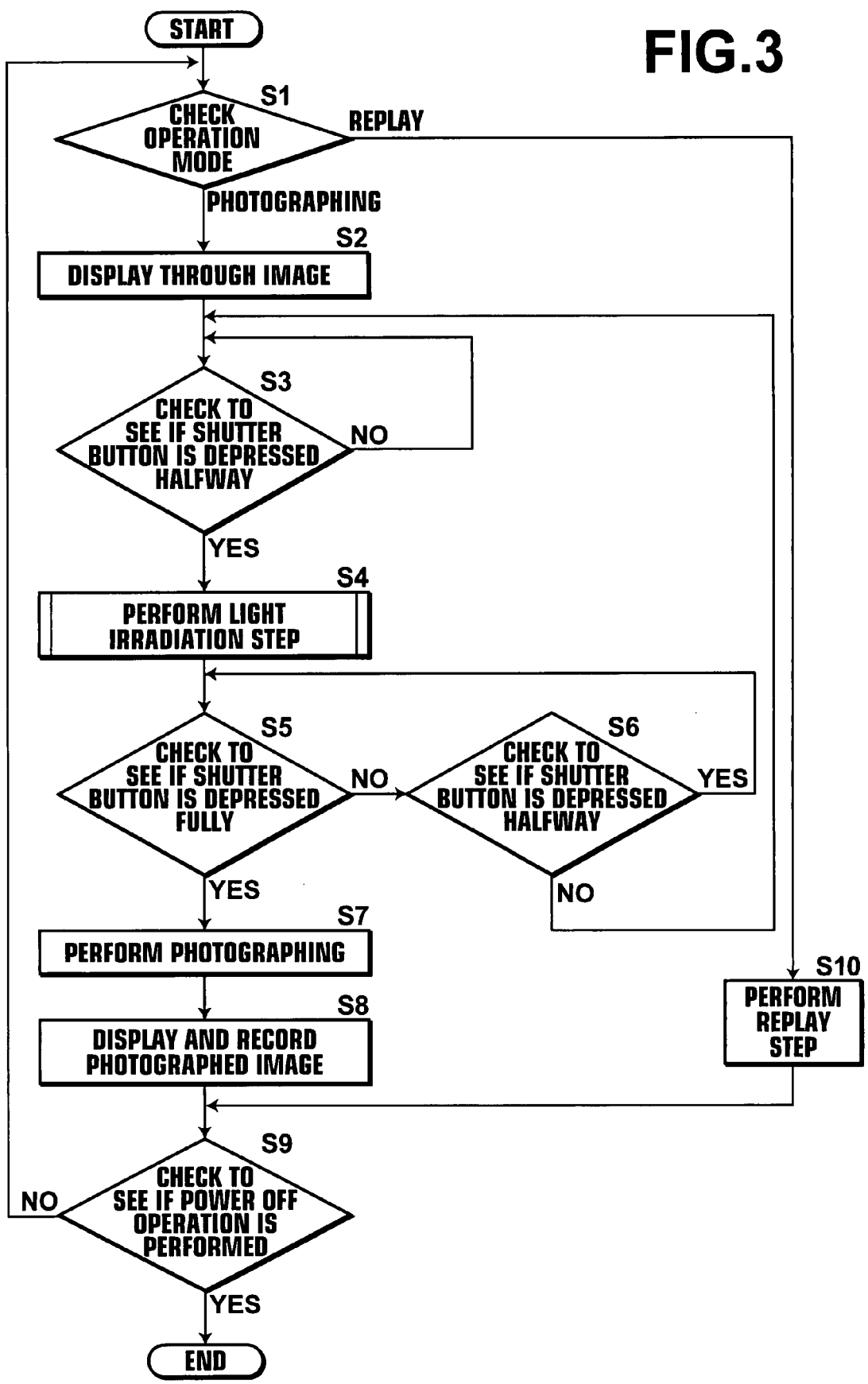
FIG. 3 is a flowchart of a photographing process of the digital camera shown in FIG. 1.

Next, a series of process steps for photographing performed by the digital camera 1 structured in the manner as described above will be described. FIG. 3 is a flowchart illustrating a series of process steps performed by the digital camera 1. When the power button 50 of the digital camera 1 is switched on, a determination is made by the CPU 10 as to whether the operation mode is photographing or replay mode, as illustrated in FIG. 3 (step S1). If it is determined to be replay mode (step S1, REPLAY), a replay step is performed (step S10). The replay step is a step in which an image file recorded on the external recording medium 12 is read out by the recording medium readout section 11, and an image based on the image data included in the image file is displayed on the liquid crystal monitor 6. When the replay step is completed, a determination is made by the CPU 10 as to whether a switch-off operation is performed through the power button 50 of the digital camera 1 (step S9). If the result is negative (step S9, NO), the process is returned to step S1 by the CPU 10, and if the result is positive (step S9, YES), the power of the digital camera 1 is switched off and the process is terminated.

In the mean time, if it is determined that the operation mode is photographing mode in step S1 (step S1, PHOTOGRAPHING), a through image is displayed through control of the CPU 10 (step S2). Then, a determination is made by the CPU 10 as to whether the shutter button 51 is depressed halfway (step S3). If the result is negative (step S3, NO), step S3 is repeated by the CPU 10, and if the result is positive (step S3, YES), a light irradiation step is performed (step S4).

Figure 4:
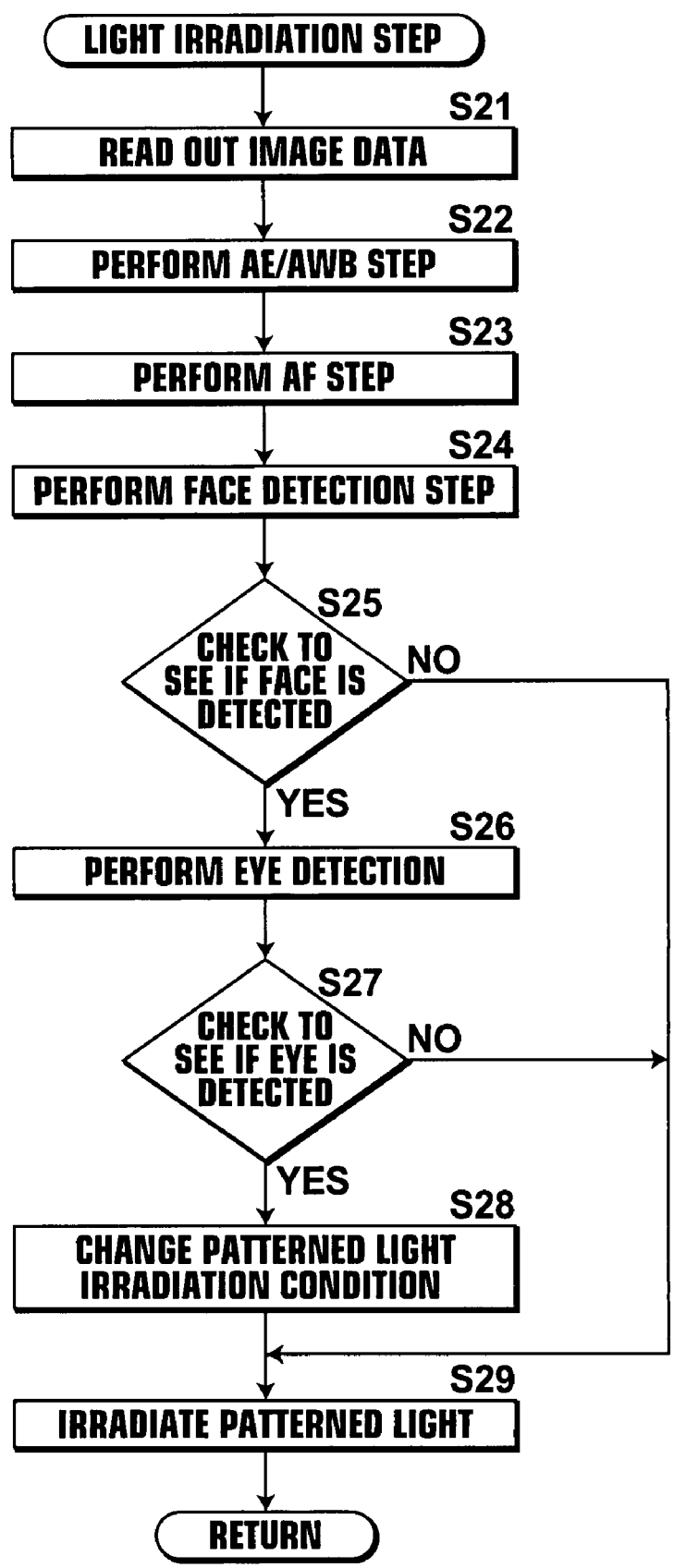
FIG. 4 is a flowchart of a light irradiation step.
Figure 5A:
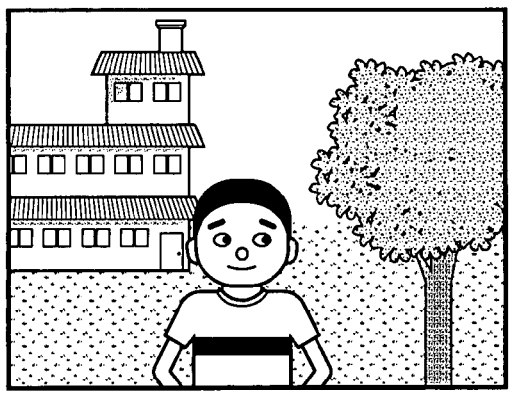
FIGS. 5A to 5D illustrate how light irradiation control is performed.

FIG. 4A illustrates a flowchart of the light irradiation step, and FIGS. 5A to 5D illustrate how light irradiation control is performed. As shown in FIG. 4, pre-image data obtained by pre-imaging performed by the CCD 22 and stored in a frame memory 68 are read out (step S21). The referent of "pre-imaging" as used herein means imaging by the CCD 22 which is caused by the CPU 10 when a halfway depression signal generated by a halfway depression of the shutter button 51 is detected by the CPU 10, and the referent of "pre-image" as used herein means an image based on the image data obtained by the pre-imaging and stored in the storage section 4. An example of pre-image is shown in FIG. 5A.

Figure 5B:
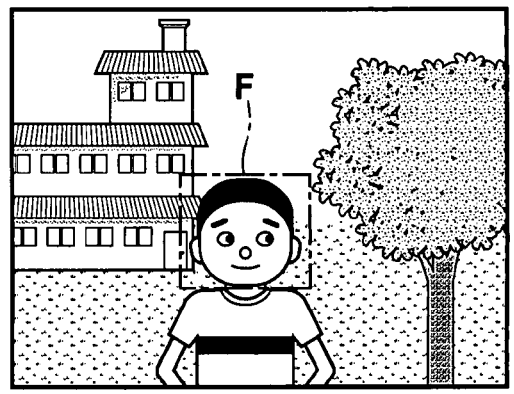
Figure 5C:
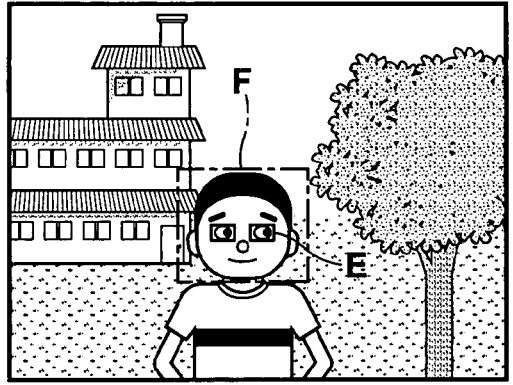

Next, an AE/AWB step (step S22) and an AF step (step S23) are performed sequentially based on the obtained pre-image (FIG. 5A). Further, as illustrated in FIG. 5B, a face detection step (step S24) is performed on the pre-image by the face detection section 71. Then, a determination is made by the CPU 10 as to whether a face is detected (step S25), and if the result is positive (step S25, YES), a detection step for an eye E (step S26) is performed by the eye detection section 72 on the detected face region F, as illustrated in FIG. 5C. Then, a determination is made by the CPU 10 as to whether an eye is detected from the face region F (step S27), and if the result is negative (step S27, NO), the patterned light P of triangle-shaped grid points disposed two-dimensionally stored in the storage section is irradiated onto the subject by the light irradiation section 7 (step S29).

In the mean time, if it is determined in step S25 that a face is not detected (step S25, NO), the patterned light P of triangle-shaped grid points disposed two-dimensionally stored in the storage section is also irradiated onto the subject by the light irradiation section 7 in the same manner as described above (step S29).

Figure 5D:
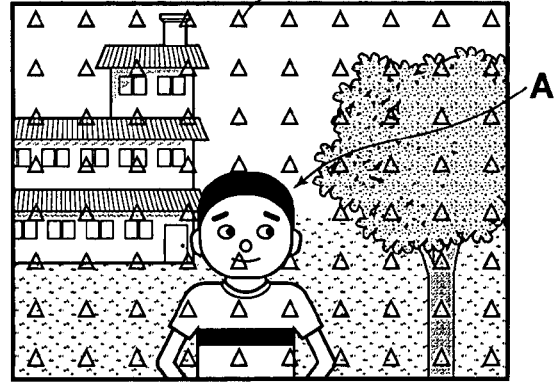

If it is determined in step S27 that the eye E is detected (step S27, YES), the irradiation range (irradiation condition) of the patterned light P is changed to the area other than A region in FIG. 5D so that the patterned light P is irradiated onto the area other than the eye E, i.e., not to be irradiated on the eye E, as illustrated in FIG. 5D (step S28). Then, the patterned light P changed in the irradiation range is irradiated onto the subject (step S29). When a person's eye is detected in the pre-image, this prevents the patterned light P to be irradiated on the person's eye by the light irradiation section 8, and the person is prevented from feeling dazzled.

After the light irradiation step (step S4) is completed in the manner as described above, a determination is made by the CPU 10 as to whether the shutter button 51 is fully depressed, with the patterned light P being irradiated (step S5), as illustrated in FIG. 3. It is noted that during the time period from the time when the patterned light P is start irradiated to the time when the shutter button 51 is fully depressed, steps S26 to S28 described above are repeated, and if the position of the eye is moved, the irradiation condition of the patterned light P is changed according to the moved eye position and the patterned light P is adapted accordingly.

If it is determined in step S5 that the shutter button 51 is not fully depressed (step S5, NO), a determination is made by the CPU 10 as to whether the shutter button 51 is depressed halfway (step S6). If the result is negative (step S6, NO), the process is returned to step S3 and if positive (step S6, YES), the process is returned to step S5 by the CPU 10.

If it is determined that the shutter button is fully depressed (step S5, YES), the CPU 10 causes a photographing step (step S7) to be performed. Here, the patterned light P is being irradiated onto the subject by the light irradiation section 8, so that the patterned light P for three-dimensional shape measurement is imaged on the image obtained by the photographing.

The referent of "photographing step" as used herein means a step in which analog image data based on a subject image formed on the photoelectric surface of the CCD 22 are A/D converted and various types of signal processing are performed thereon. The photographing step may include an image file generation by the compression/expansion section (not shown) by performing compression on the processed image data.

When the photographing is completed in the manner as described above, the CPU 10 causes the obtained image to be displayed on the liquid crystal monitor 6 and at the same time the image is stored in the external memory 12 (step S8). Then, a determination is made by the CPU 10 as to whether a switch-off operation of the power (not shown) of the digital camera 1 is performed (step S9), and if the result is positive (step S9, YES), the power of the digital camera 1 is switched off and the process is terminated. If the result is negative (step S9, NO), the process is returned to step S1. In this way, the photographing process is performed by the digital camera 1.

In the present embodiment, it has been described that the patterned light is kept irradiated during the time period from the time when the shutter button 51 is depressed halfway to the time when the photographing is performed. But the present invention is not limited to this, and the patterned light may be irradiated, for example, only when the shutter button 51 is fully depressed.

According to the present embodiment, if the predetermined object is an object that does not want the patterned light to be irradiated, the irradiation condition of the patterned light is changed by the light control section 9 so that the patterned light is irradiated on the area other than the predetermined object. Thus, the patterned light is prevented from being irradiated on an object that does not want the patterned light to be irradiated. Further, when the patterned light is wanted to be irradiated only on the predetermined object, the patterned light may be irradiated only on the object to be irradiated by changing the irradiation condition of the patterned light by the light control section 9 such that the patterned light is irradiated only on the object.

If the predetermined object is a person's eye, and the irradiation condition is changed so that the patterned light is irradiated on the area other than the eye, then the patterned light is prevented from being irradiated on the eye, and the person is prevented from feeling dazzled.

Figure 6:
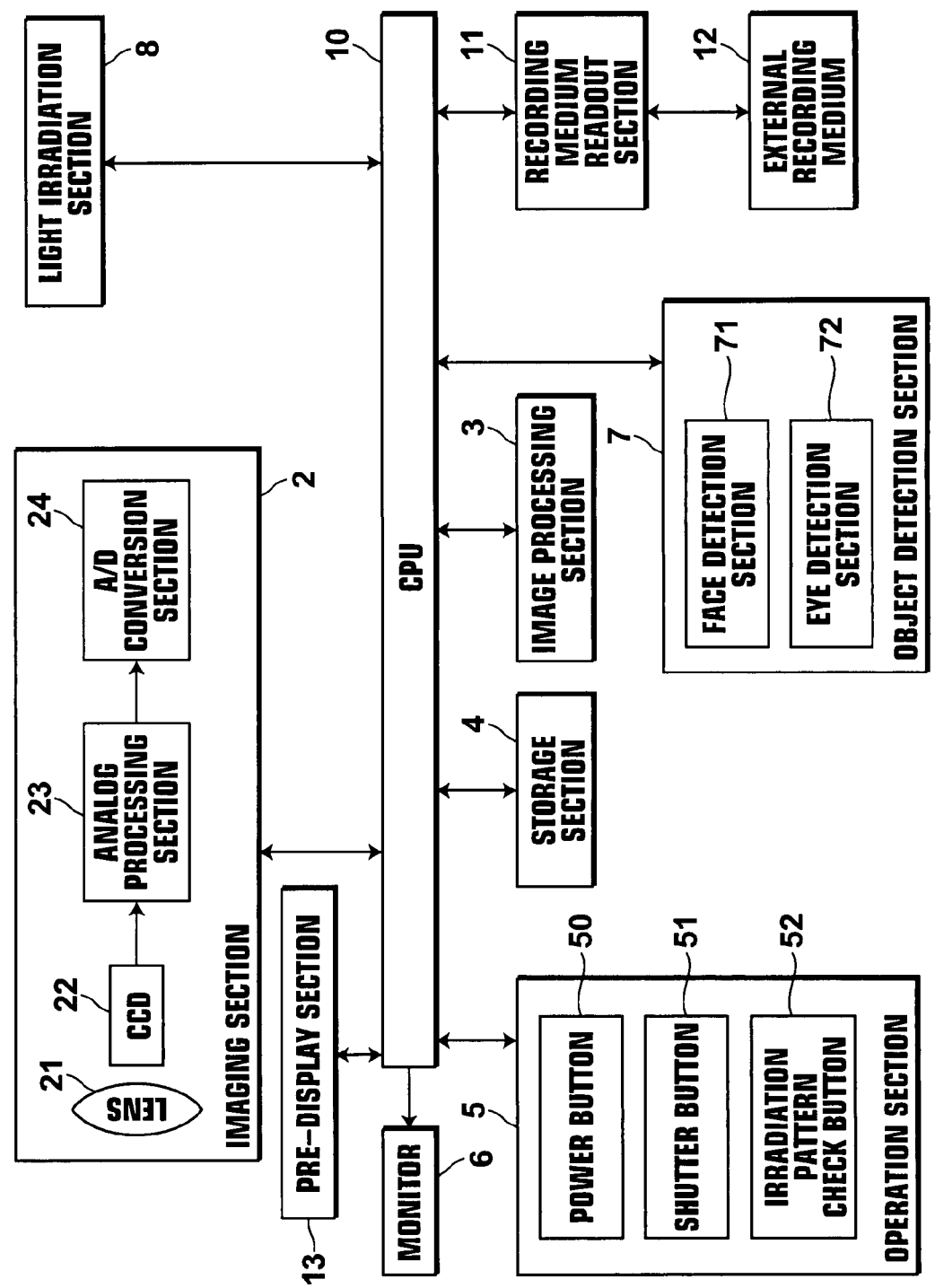
FIG. 6 is a block diagram of the digital camera according to an alternative embodiment, schematically illustrating the structure thereof.

Next, a digital camera 1-A according to an alternative embodiment of the present invention will be described. The components of the digital camera 1-A identical to those of the digital camera 1 are given the same reference symbols and will not be elaborated upon further, and only the different components are described in detail here. FIG. 6 is a block diagram of the digital camera 1-A of the present embodiment, schematically illustrating the structure thereof.

The digital camera 1-A of the present embodiment differs from the digital camera 1 of the embodiment described above in that it does not include the light control section 9. Further, the digital camera 1-A of the present embodiment includes a pre-display section 13 and an irradiation pattern check button 52.

The pre-display section 13 causes the liquid crystal monitor to display an irradiation shape of the patterned light P irradiated by the light irradiation section 8, i.e., a display image on the liquid crystal panel 85 (patterned light P') superimposed on a through image prior to performing the photographing. The irradiation pattern check button 52 is a button for activating the pre-display section 13. A single depression of the irradiation pattern check button 52 causes the pre-display section 13 to be activated, and another depression of the button 52 while the pre-display section 13 is activated causes the pre-display section 13 to be inactivated.

Figure 7A:
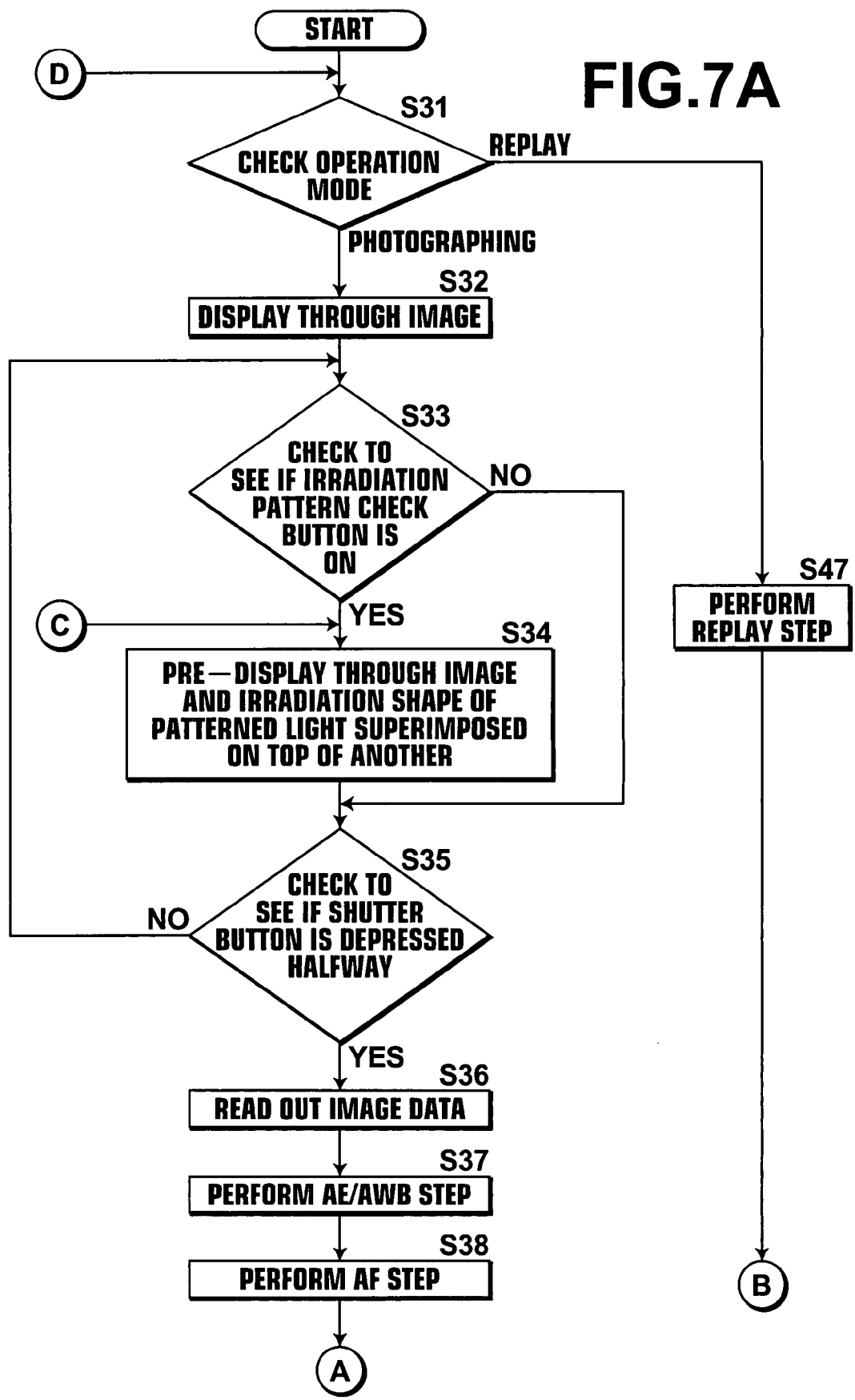
FIG. 7A is a flowchart of a photographing process of the digital camera shown in FIG. 6 (Part 1).
Figure 7B:
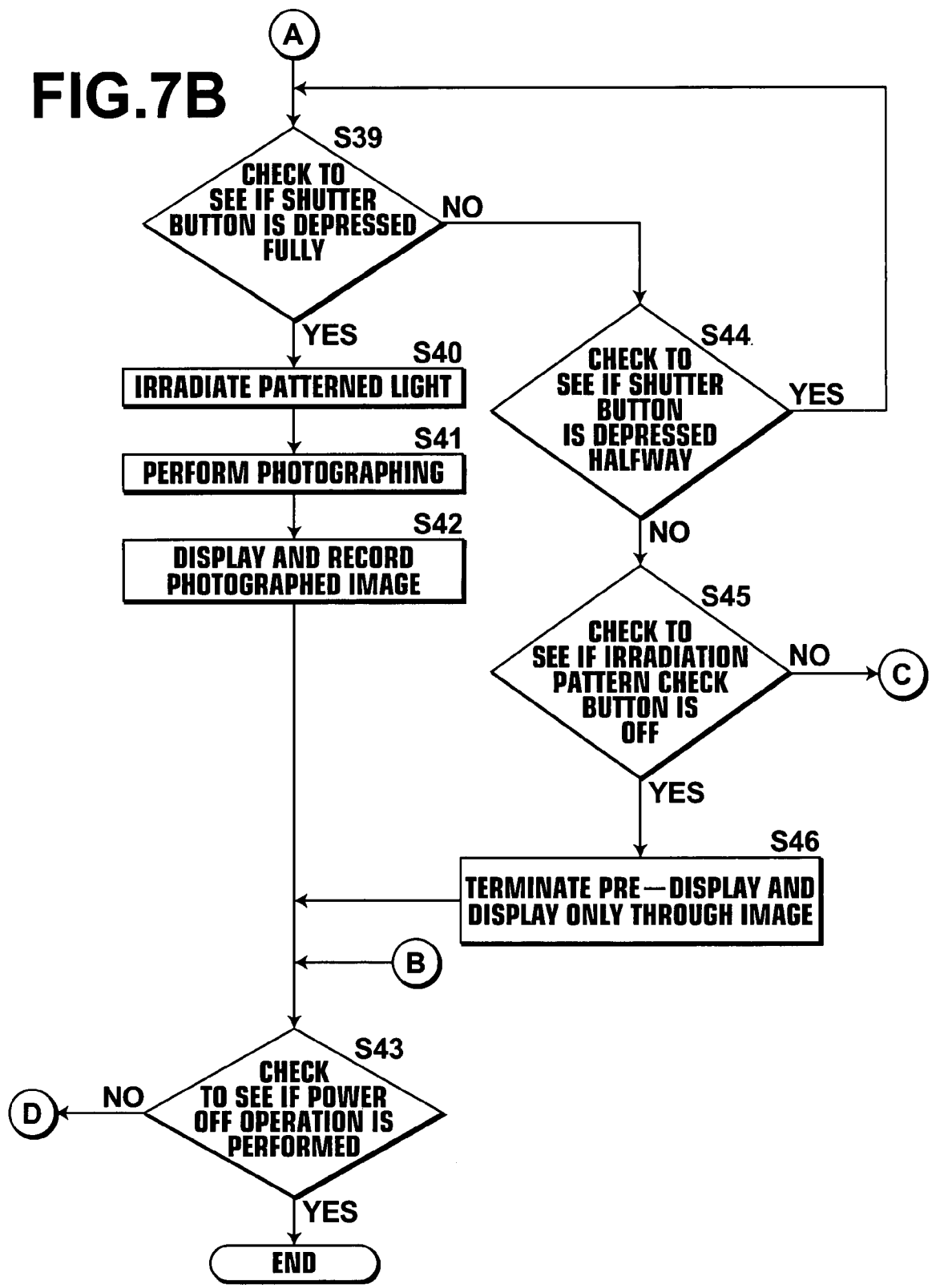
FIG. 7B is a flowchart of a photographing process of the digital camera shown in FIG. 6 (Part 2).
Figure 8A:
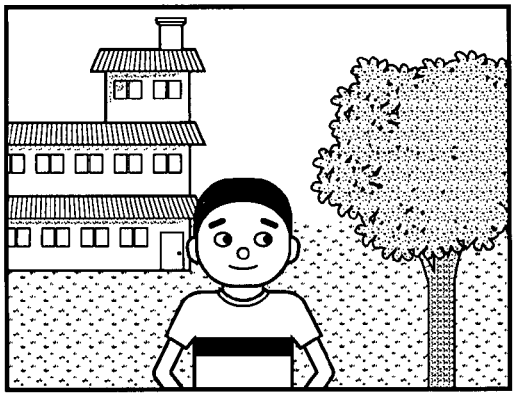
FIGS. 8A to 8C illustrate how pre-display is performed.
Figure 8B:
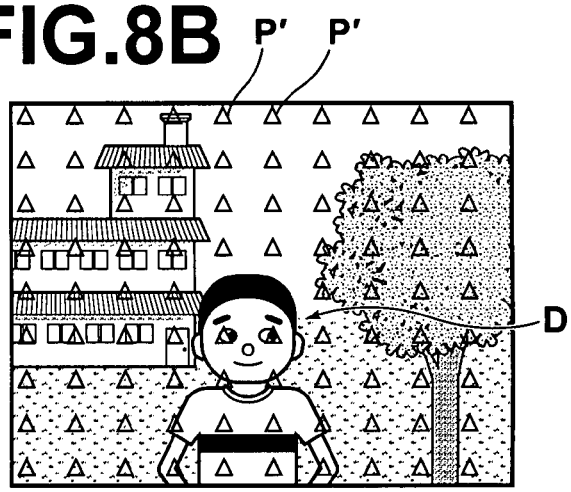
Figure 8C:
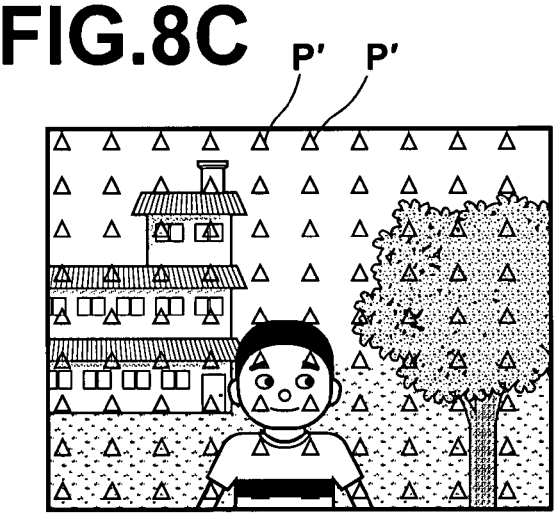

Next a series of process steps for photographing performed by the digital camera 1-A structured in the manner as described above will be described. FIGS. 7A and 7B are a flowchart illustrating a series of process steps performed by the digital camera 1-A. FIGS. 8A to 8C illustrates pre-displays of the pre-display section 13. When the power button 50 of the digital camera 1-A is switched on, a determination is made by the CPU 10 as to whether the operation mode is photographing or replay mode, as illustrated in FIG. 7A (step S31).

If it is determined to be replay mode (step S31, REPLAY), a replay step is performed (step S47). The replay step is a step in which an image file recorded on the external recording medium 12 is read out by the recording medium readout section 11, and an image based on the image data included in the image file is displayed on the liquid crystal monitor 6. When the replay step is completed, a determination is made by the CPU 10 as to whether a switch-off operation is performed through the power button 50 of the digital camera 1-A (step S43). If the result is negative (step S43, NO), the process is returned to step S31 by the CPU 10, and if the result is positive (step S43, YES), the power of the digital camera 1-A is switched off and the process is terminated.

In the mean time, if it is determined that the operation mode is photographing mode in step S31 (step S31, PHOTOGRAPHING), a through image (FIG. 8A) is displayed through control of the CPU 10 (step S32). Next, a determination is made by the CPU 10 as to whether the irradiation pattern check button 52 is depressed (step S33). If the result is negative (step S33, NO), the process is moved to step S35 by the CPU 10 to make a determination as to whether the shutter button 51 is depressed halfway (step S35).

In the mean time, if it is determined in step S33 that the irradiation pattern check button 52 is switched on (step S33, YES), the pre-display section 13 causes the liquid crystal monitor 6 to perform a pre-display in which a through image and the patterned light P' are displayed superimposed on top of another, as illustrated in FIG. 8B (step S34).

In this way, prior to performing the photographing, the user may check the irradiation range, irradiation position, pattern shape, and the like of the patterned light P' to be irradiated by the light irradiation section 8 when photographing. Accordingly, if a person is included in the through image and the patterned light P' is displayed superimposed on the eye of the person as illustrated in FIG. 8B (area D), the user may change the photographing field angle so that the patterned light is not superimposed on the eye of the person as illustrated in FIG. 8C. This prevents the patterned light P' from being irradiated on the eye of the person by the light irradiation section 8 when photographing without changing the irradiation condition of the patterned light P'. It is noted that a configuration is adopted in which the optical axis of the light irradiation section 8 and the optical axis of the lens 21 are linked together.

Then, when a pre-display on the liquid crystal monitor 6 is performed by the pre-display section 13, the process is proceeded to step S35 and a determination is made by the CPU 10 as to whether the shutter button 51 is depressed halfway (step S35). If the result is negative (step S35, NO), the process is returned by the CPU 10 to step S33 and the steps following the step S33 are repeated.

In the mean time, if it is determined that the shutter button 51 is depressed halfway (step S35, YES), the pre-image data pre-imaged by the CCD 22 and stored in the frame memory 68 are read out (step S36). Next, an AE/AWB step (step S37) and an AF step (step S38) are performed sequentially based on the obtained pre-image (FIG. 8A).

Then, as illustrated in FIG. 7B, a determination is made by the CPU 10 as to whether the shutter button 51 is fully depressed (step S39). If it is determined that the shutter button 51 is fully depressed (step S39, YES), the patterned light P' is irradiated onto the subject by the light irradiation section 8 (step S40), and the CPU 10 causes a photographing step (step S41) to be performed. Here, the patterned light P' is being irradiated onto the subject by the light irradiation section 8, so that the patterned light P' for three-dimensional shape measurement is imaged on the image obtained by the photographing.

When the photographing is completed in the manner as described above, the CPU 10 causes the obtained image to be displayed on the liquid crystal monitor 6 and at the same time the image is stored in the external memory 12 (step S42). Then, a determination is made by the CPU 10 as to whether a switch-off operation of the power button 50 of the digital camera 1-A is performed (step S43), and if the result is positive (step S43, YES), the power of the digital camera 1-A is switched off and the process is terminated. If the result is negative (step S43, NO), the process is returned to step S31.

If it is determined in step S39 that the shutter button 51 is not fully depressed (step S39, NO), a determination is made by the CPU 10 as to whether the shutter button is depressed halfway (step S44), and if the result is positive (step S44, YES), the process is returned to step S39 by the CPU 10, and the steps following the step S39 are repeated. On the other hand, if it is determined in step S39 that the shutter button 51 is not depressed halfway (step S44, NO), a determination is made by the CPU 10 as to whether the irradiation pattern check button 52 is switched off (step S45).

If the result is positive (step S45, YES), the pre-display section 13 causes the pre-display on the liquid crystal monitor 6 to be terminated, and only the through image to be displayed on the liquid crystal monitor 6 (step S46), and the process is returned to step S43 by the CPU 10. In the mean time, if it is determined that the irradiation pattern check button 52 is not switched off (step S45, NO), the process is returned to step S34, and the pre-display on the liquid crystal monitor 6 is maintained by the pre-display section 13, as illustrated in FIG. 7A. In this way, the photographing process is performed by the digital camera 1-A.

According to the present embodiment, the patterned light is pre-displayed on the liquid crystal display 6 superimposed on the image data prior to performing the photographing, so that the user may check the irradiation pattern of the patterned light when photographing based on the irradiation condition, such as the irradiation range, irradiation position, patterned shape, or the like, prior to photographing. For example, if a person is included in an image displayed on the liquid crystal display 6, and the patterned light is displayed superimposed on the eye of the person, or the like, this allows the user to change the photographing field angle such that the patterned light is not superimposed on the eye of the person, so that the patterned light is prevented from being irradiated on the eye of the person without changing the irradiation condition of the patterned light P when photographing.

Next, a digital camera 1-B according to a further alternative embodiment of the present invention will be described. The components of the digital camera 1-B identical to those of the digital camera 1-A are given the same reference symbols and will not be elaborated upon further, and only the different components are described in detail here. FIG. 9 is a block diagram of the digital camera 1-B of the present embodiment, schematically illustrating the structure thereof. The digital camera 1-B of the present embodiment differs from the digital camera 1-A in that it further includes a light changing section 14 and a patterned light changing button 53 as a light changing unit.

Figure 10A:
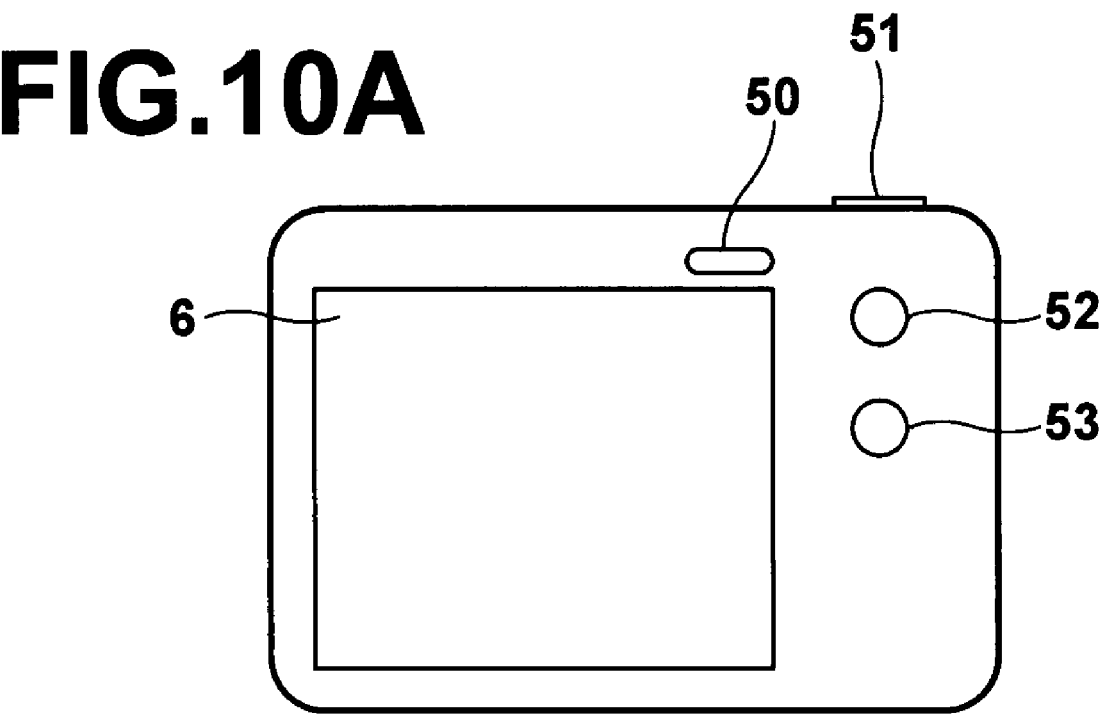
FIGS. 10A and 10B are rear views of the digital camera shown in FIG. 9.
Figure 10B:
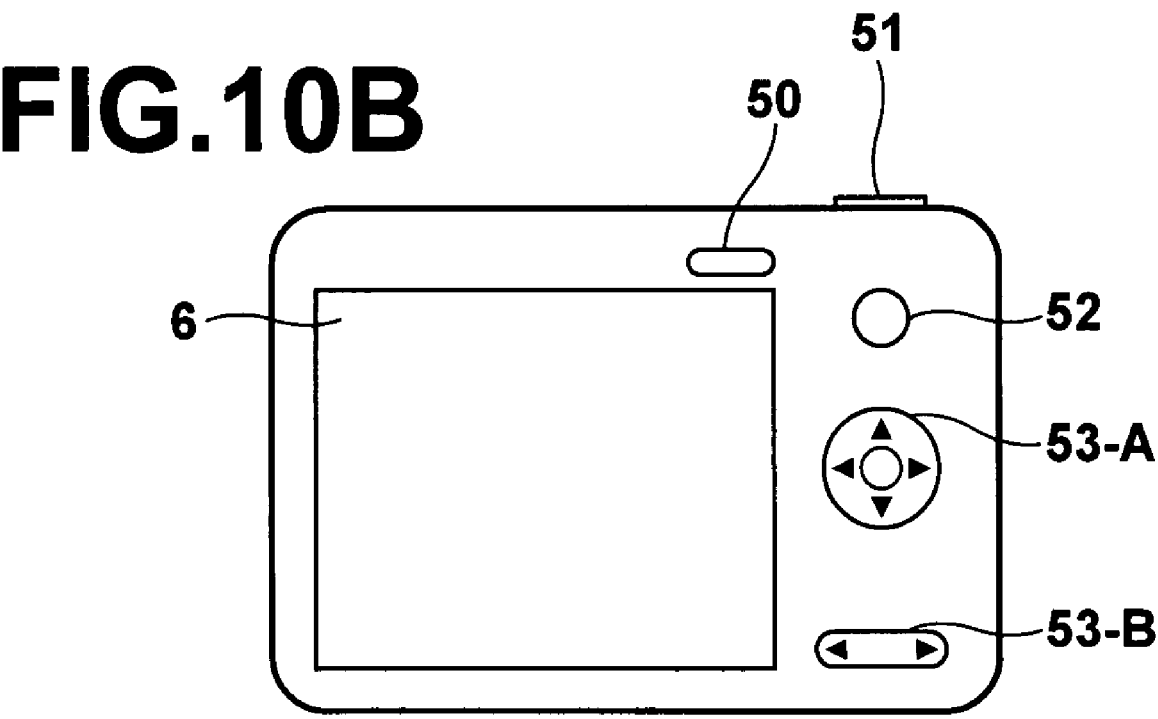

The light changing section 14 is a section for changing the irradiation condition of the patterned light P, which is activated when the patterned light changing button 53 is depressed. Rear views of the digital camera 1-B of the present invention are shown in FIGS. 10A and 10B. As illustrated in FIG. 10A, on the rear face, the power button 50 is disposed on the upper right of the liquid crystal monitor 6, and the irradiation pattern check button 52 and patterned light changing button 53 are disposed from top down on the right side of the liquid crystal monitor 6. Each time the patterned light changing button 53 is depressed, a plurality of pattern shapes of the patterned light P stored in the storage section 4 is sequentially read out by the light changing section 14, and the pattern shape is changed by changing the display image (patterned light P') on the liquid crystal panel 85 according to the readout shape data.

Figure 11A:
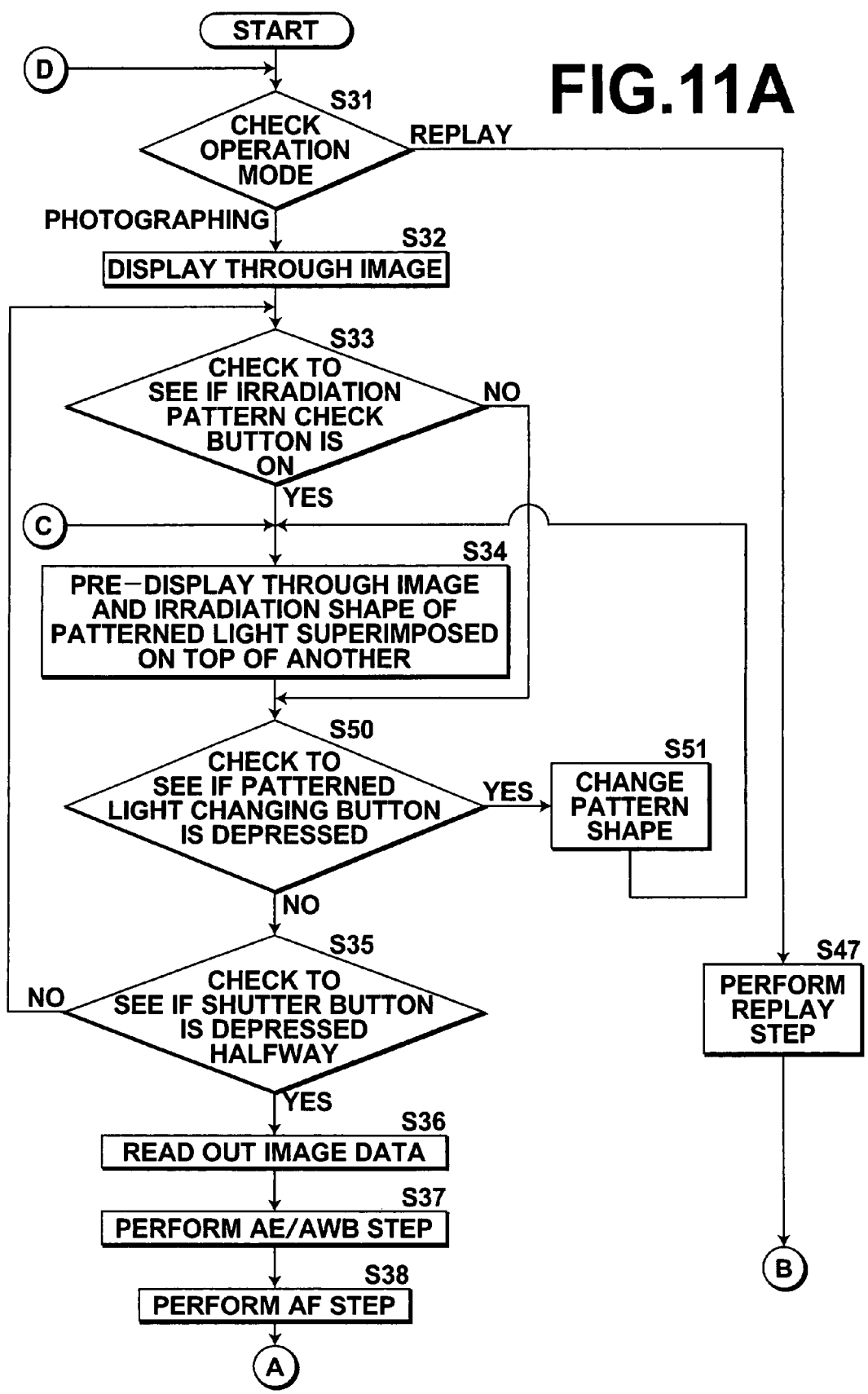
FIG. 11A is a flowchart of a photographing process of the digital camera shown in FIG. 9 (Part 1).

Next, a series of process steps for photographing performed by the digital camera 1-B structured in the manner as described above will be described. FIGS. 11A and 11B are a flowchart illustrating a series of process steps performed by the digital camera 1-B. FIGS. 12A to 12D illustrates how the patterned light is changed. It is noted that process steps shown in FIGS. 11A and 11B identical to those shown in FIGS. 7A and 7B are given the same reference symbols and will not be elaborated upon further here.

Figure 12A:
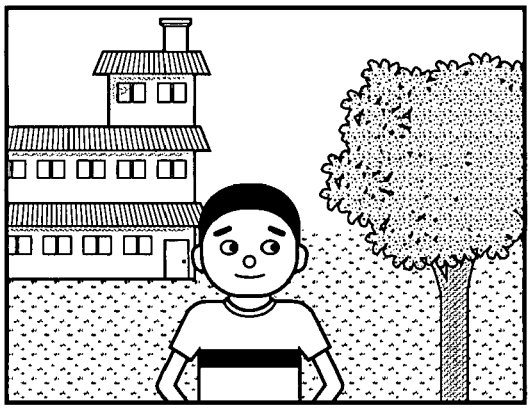
FIGS. 12A to 12D illustrate how patterned light is changed.
Figure 12B:
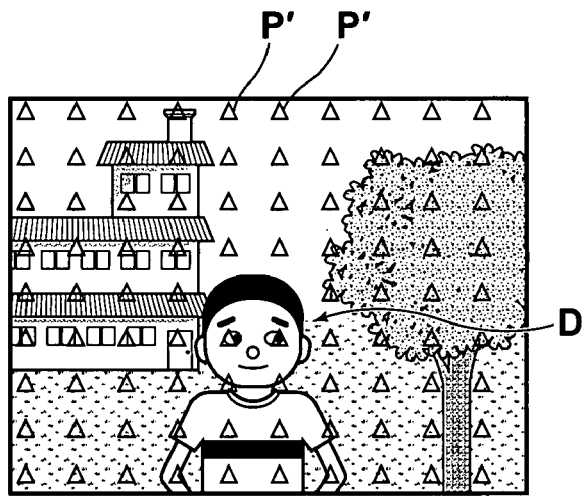
Figure 12C:
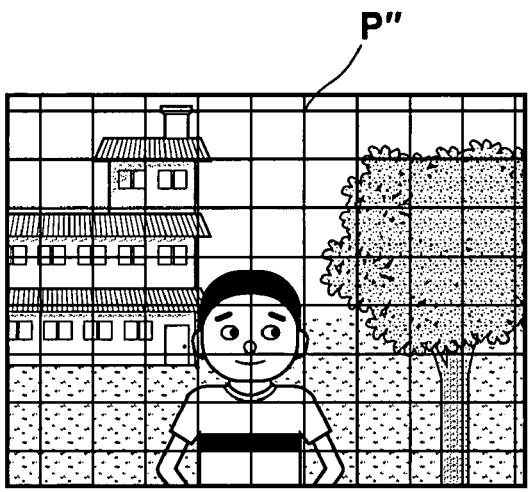
Figure 12D:
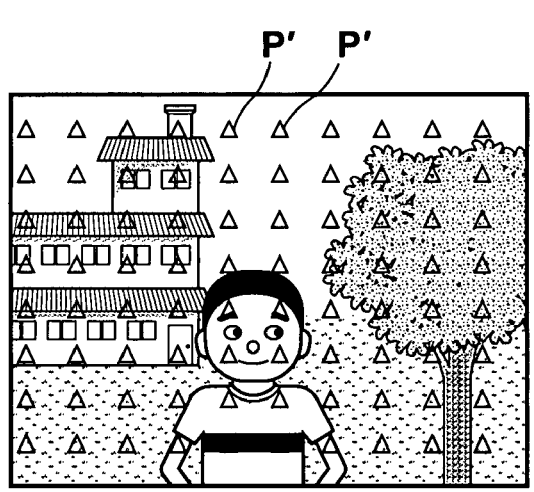

In the digital camera 1-B of the present embodiment, when a pre-display on the liquid crystal monitor 6 is performed in step S34, a determination is made by the CPU 10 as to whether the patterned light changing button 53 is depressed (step S50). If the result is positive (step S50, YES), the pattern shape is changed by the light changing section 14 in the manner as described above (step S51), and the changed irradiation pattern shape and through image are pre-displayed superimposed on top of another (step S34). Here, if the patterned light P' is displayed superimposed on an eye of the person as illustrated in FIG. 12B (area D), the user of the digital camera 1-B may depress the patterned light changing button 53 to sequentially select the pattern shapes stored in the storage section 4 and may change the pattern shape. For example, the pattern shape may be changed from the triangle-shaped grid points disposed two-dimensionally to grid lines as illustrated in FIG. 12C, thereby patterned light P''' not superimposed on the eye of the person may be selected. This prevents the patterned light P irradiated from the light irradiation section 8 when photographing from being irradiated on the eye of the person.

In the mean time, if it is determined in step S50 that the patterned light changing button 53 is not depressed (step S50, NO), the process is moved to step S35, and steps following the step 35 are performed. The steps following the step S35 are identical to those shown in FIGS. 7A and 7B so that they will not be elaborated upon further here. In this way, the photographing process is performed by the digital camera 1-B.

In the present embodiment, the description has been made of a case in which the light changing section 14 changes the pattern shape. But the present invention is not limited to this and, for example, the irradiation position of the patterned light may be changed by the light changing section 14. Here, an alternative embodiment of the light changing section 14 and patterned light changing button 53 will be described. The patterned light changing button 53 of the present embodiment includes an arrow key 53-A which may be depressed in up, down, right, and left directions, and a right/left key which may be depressed in right and left directions, as illustrated in FIG. 10B.

For example, when the lower side of the arrow key 53-A is depressed while the image illustrated in FIG. 12B is pre-imaged on the liquid crystal monitor 6, the light changing section 14' of the present embodiment causes the patterned light P' to be moved downward by predetermined pixels. This allows the user to move the patterned light P' to a position where the patterned light P' does not overlap with the eye of the person. A depression of the arrow key 53-A in the upper, right, or left side causes the patterned light P' to be moved upward, rightward, or leftward.

If the right/left key 53-B is depressed, for example, in the right side, the patterned light P' is rotated clockwise by a predetermined angle centered on the optical axis of the light source 81 of the light irradiation section 8, and if the left side is depressed, the patterned light P' is rotationally moved counterclockwise.

According to the present embodiment, if a person is included in the image displayed on the liquid crystal monitor 6, and the patterned light is displayed superimposed on an eye of the person, the user of the digital camera 1-B may change the irradiation condition of the patterned light such that the patterned light does not overlap with the eye of the person without changing the field angle.

In the aforementioned embodiments, the light irradiation section 8 is structured in the manner as described above, but the present invention is not limited to this. For example, a slit plate including slits having desired shapes may be disposed in front of the light source. In this case, irradiation position of the patterned light may be changed by mechanically moving the slit plate, for example, by a motor.

Further, in the aforementioned embodiments, the description has been made of a case in which the light control section (light control unit) 9 changes the irradiation condition such that the patterned light is irradiated on the area other than the eye of a person, but the present invention is not limited to this. For example, when measuring the three-dimensional shape of a sculpture displayed in an art museum, an arrangement may be adopted in which the sculpture is detected by the object detection unit, and the irradiation condition is changed such that the patterned light is irradiated only on the detected sculpture. In this way, when a painting or the like is displayed at the back of the sculpture that does not want the patterned light to be irradiated, the patterned light may be prevented from being irradiated on the painting or the like.

Further, the adoption of the arrangement in which the sculpture is detected by the object detection unit, and the irradiation condition is changed such that the patterned light is irradiated only on the detected sculpture allow the patterned light to be tracked on the face so that the patterned light is invariably irradiated on the face.

An photographing apparatus according to the present invention includes:

an imaging unit for obtaining image data by imaging a subject;

a display unit for displaying the obtained image data;

a light irradiation unit for irradiating patterned light for three-dimensional shape measurement onto the subject when photographing; and a pre-display unit for displaying the irradiation pattern of the patterned light on the display unit superimposed on the image data prior to performing the photographing.

The photographing apparatus described above may include a light changing unit capable of arbitrarily changing the irradiation condition of the patterned light.

A photographing method according to the present invention is a method for photographing a subject by irradiating patterned light for three-dimensional shape measurement when photographing, the method including the steps of:

obtaining image data by imaging a subject prior to photographing;

displaying the obtained image data on a display unit;

pre-displaying the irradiation pattern of the patterned light on the display unit superimposed on the image data.

According to the photographing apparatus and photographing method described above, the irradiation pattern of the patterned light is pre-displayed on the display unit prior to photographing, so that the user may check the irradiation pattern of the patterned light, which is based on the irradiation condition at the time of photographing, prior to the photographing. For example, if a person is included in an image displayed on the display unit, and the patterned light is displayed superimposed on the eye of the person or the like, this allows the user to change the photographing field angle such that the patterned light is not superimposed on the eye of the person, so that the patterned light is prevented from being irradiated on the eye of the person without changing the irradiation condition of the patterned light when photographing.

Further, if the photographing apparatus described above includes a light changing unit capable of arbitrarily changing the irradiation condition of the patterned light, then, for example, when a person is included in an image displayed on the display unit, and the patterned light is displayed superimposed on an eye of the person or the like, the user may change the irradiation condition such that the patterned light is not superimposed on the eye of the person without changing the field angle.

Next, a digital camera 100, as the photographing apparatus according to a second embodiment of the present invention, will be described in detail with reference to the accompanying drawings.

Figure 13:
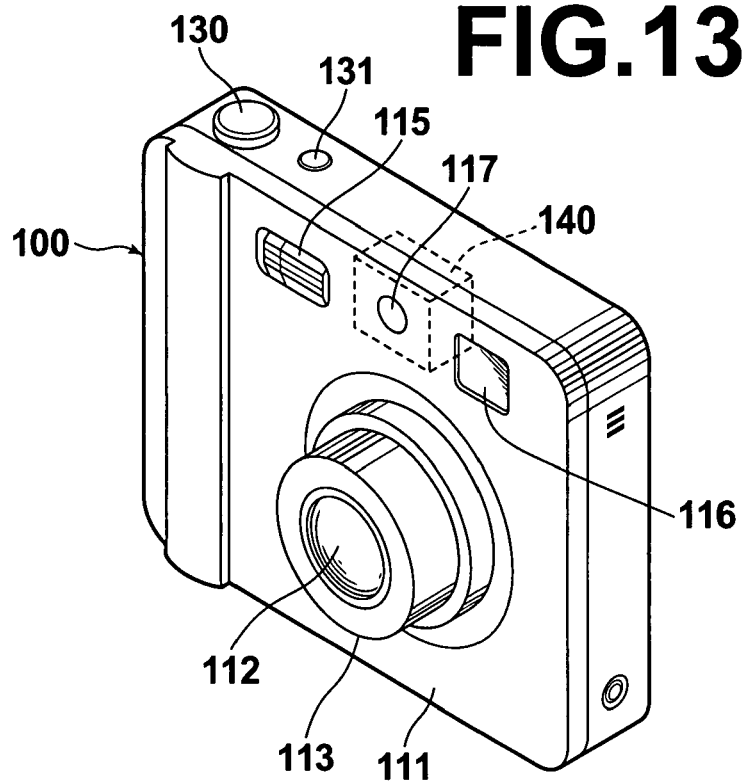
FIG. 13 is a perspective view of the digital camera according to a second embodiment, schematically illustrating the front view thereof.
Figure 14:
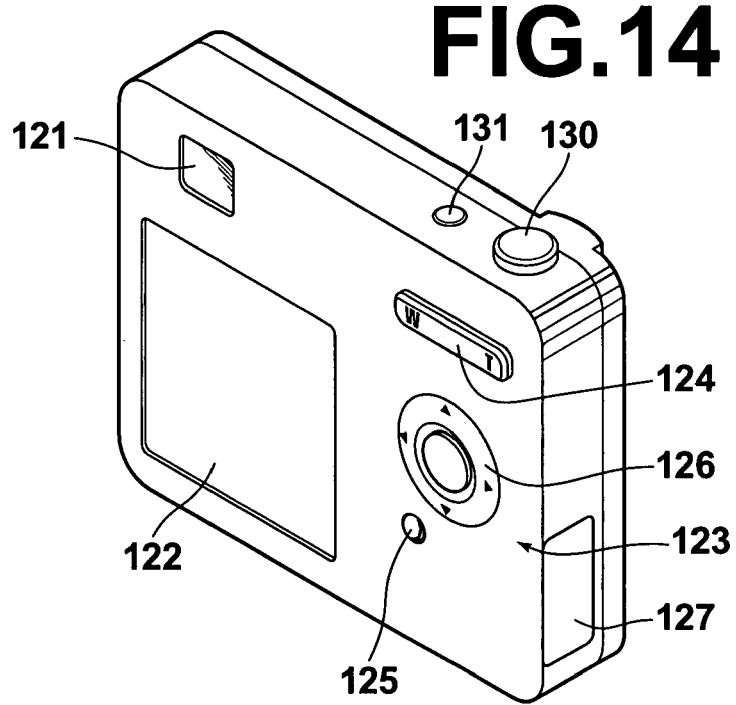
FIG. 14 is a perspective view of the digital camera shown in FIG. 13, schematically illustrating the rear view thereof.

As illustrated in FIGS. 13 and 14, the digital camera 100 includes a retractable lens camera cone 113 including a taking lens 112 on the front face of the camera body 111. The lens camera cone 113 protrudes to the position shown in FIG. 13 when used, and received within the camera body 111 when not used. Further, a flash emission section 115, a finder objective window, and an auxiliary light window 117 are provided on the front face of the camera body. The auxiliary light window 117 is provided for irradiating AF auxiliary light from an auxiliary light irradiation unit 140 provided inside of the camera body 111 onto a subject when performing focus control of the taking lens 112 under dark ambient conditions, such as during the nighttime.

A finder ocular window 121, a liquid crystal display (LCD) 122, and an operation section 123 are provided on the rear face of the camera body 111. The LCD 122 displays various menu screens as well as photographed images and through images. The operation section 123 includes a zoom operation button 124 for varying a zoom lens 171 (FIG. 17) of the taking lens 112 to the wide or telescope side, a menu button 125 for displaying a menu screen on the LCD 122 and determining a selected item on the menu screen, and an arrow key 126 for moving the cursor within a menu screen, and the like. A lid 127 is provided on a side of the camera body 111, which covers a memory card slot in which a memory card 202 (FIG. 17) is detachably mounted.

In addition, a release button 130 and a power button 131 are provided on the upper face of the camera body 111. The release button 130 is a two-step depression switch. When the release button 130 is lightly depressed (halfway depression) after a subject is framed by the LCD 122, various preparatory processes, including auto exposure (AE) and auto focus (AF) operations are performed. Under this state, if the release button 130 is further depressed (full depression), preparatory-processed image signals for one screen are converted to image data, then subjected to image processing and compression, to be described later, and stored in the memory card 202.

Figure 15:
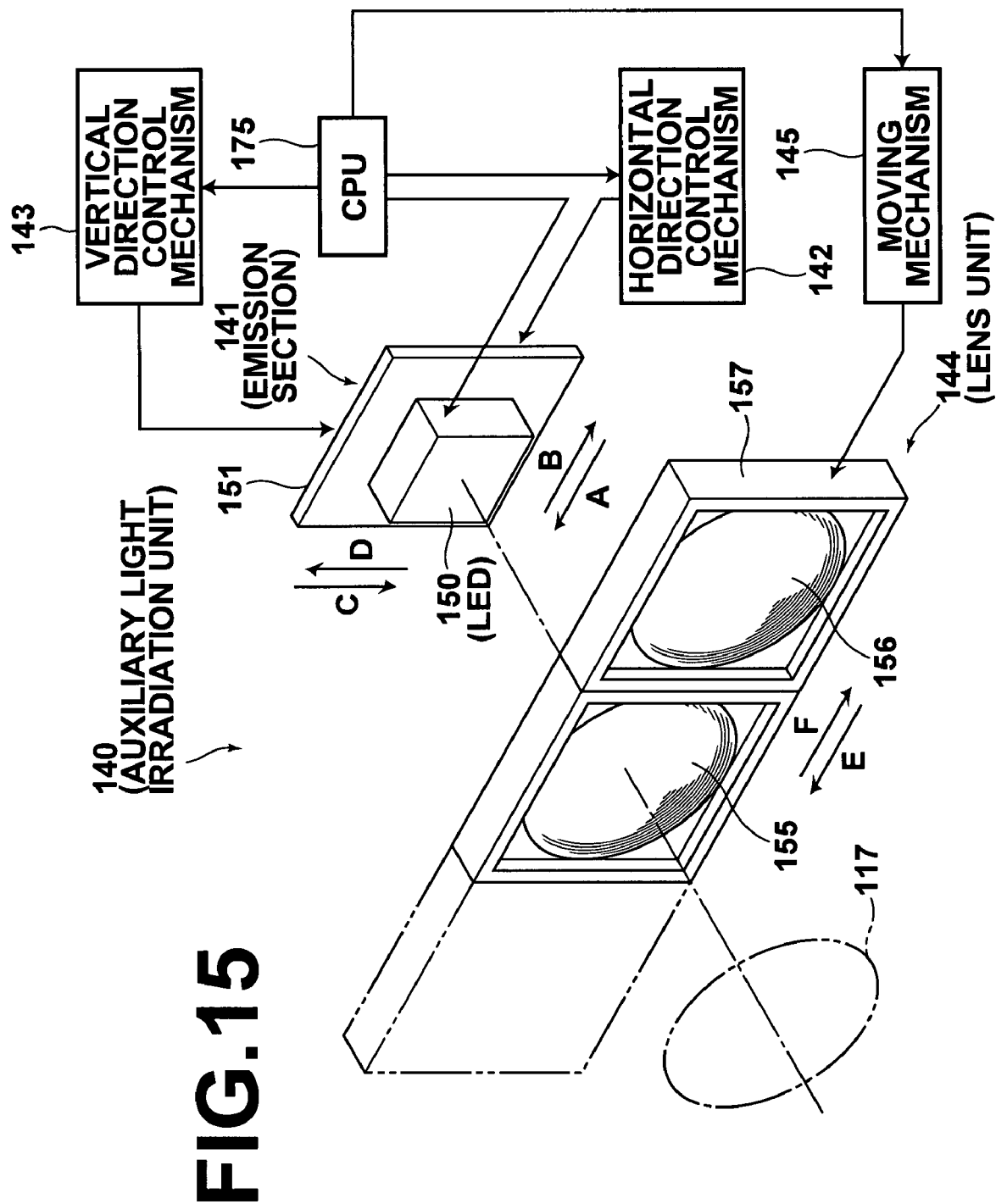
FIG. 15 is a perspective view of the auxiliary light irradiation unit, schematically illustrating the structure thereof.

The auxiliary light irradiation unit (auxiliary light irradiation unit) 140 is provided inside of the camera body 100. As illustrated in FIG. 15, the auxiliary light irradiation unit 140 includes an emission section 141, horizontal direction control mechanism (irradiation direction changing section) 142, a vertical direction control mechanism (irradiation direction changing section) 143, a lens unit 144, and a moving mechanism (lens moving section) 145.

The emission section 141 includes a LED (light source) 150 and a holding plate 151 for holding the LED 150. Further, the emission section 141 is maintained at a position by the angle control mechanisms 142, 143 such that the optical axis of the LED 150 corresponds to the center of the auxiliary light window 117. Hereinafter, the position of the emission section 141 where the optical axis of the LED 150 corresponds to the center of the auxiliary light window 117 is referred to as the reference position. The position of the emission section 141 is controlled in the A or B direction by the horizontal direction control mechanism 142 and in the C or D direction by the vertical direction control mechanism 143. As for the structure of the horizontal direction control mechanism 142 and vertical direction control mechanism 143, a combination of a rack-and-pinion and a motor may be adopted. But it is not limited to this, and any structure may be adopted as long as it is capable of moving the emission section in the horizontal and vertical directions.

The lens unit 144 includes two types of lenses 155, 156 and a holding frame 157 for holding the lenses. As for the two types of lenses 155, 156, a lens for wide angle (wide-angle lens 155) and a lens for narrow angle (narrow-angle lens 156) are used. The wide-angle lens 155 is used for detecting the position of a human or animal face portion within a subject image, and illuminates the entire subject.

Figure 16:
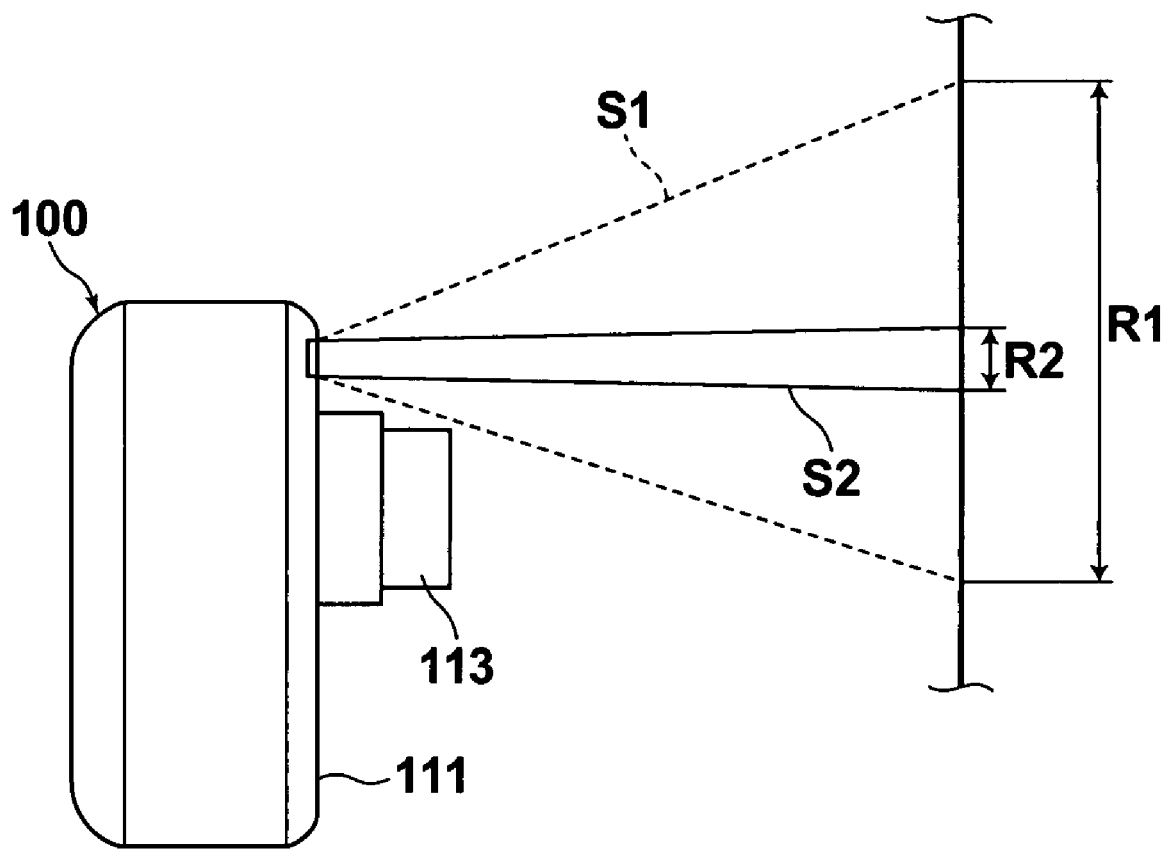
FIG. 16 illustrates the irradiation range of the auxiliary light.

Hereinafter, AF auxiliary light through the wide-angle lens 155 is referred to as the wide-angle auxiliary light S1. The narrow-angle lens 156 is used in a case where the wide-angle auxiliary light is insufficient for performing an AF operation. Hereinafter, AF auxiliary light through the narrow-angle lens 156 is referred to as the narrow-angle auxiliary light S2. As illustrated in FIG. 16, when the wide-angle auxiliary light S1 is irradiated onto a subject, the irradiation range is a range R1, whereas when the narrow-angle auxiliary light S2 is irradiated onto the subject, the irradiation range is a range R2. Thus, when the wide-angle auxiliary light S1 is irradiated, the irradiation angle becomes greater in comparison with the case where the narrow-angle auxiliary light S2 is irradiated. Accordingly, the subject brightness becomes greater when the narrow-angle auxiliary light S2 is irradiated than when the wide-angle auxiliary light S1 is irradiated.

The moving mechanism 145 moves the lens unit 144 in the E or F direction to switch the lens to be used. For example, it is assumed that the position of the lens unit 144 when the wide-angle lens 155 is used is the wide-angle position (position indicated by the solid line in FIG. 15), and the position of the lens unit 144 when the narrow-angle lens 156 is used is the narrow-angle position (position indicated by the chain double-dashed line in FIG. 15). For example, when the lens unit 144 is placed at the wide-angle position, the optical axis of the LED 150 in the reference position corresponds to the optical axis of the wide-angle lens 155. Likewise, when the lens unit 144 is placed at the narrow-angle position, the optical axis of the LED 150 in the reference position corresponds to the optical axis of the narrow-angle lens 156. In this way, the wide-angle lens 155 and moving mechanism 145 function as an auxiliary light irradiation angle changing section. As for the moving mechanism 145, for example, a combination of a rack-and-pinion and a motor may be employed. The position of the lens unit 144 moved by the moving mechanism 145 is detected by a not shown photointerrupter or the like.

Figure 17:
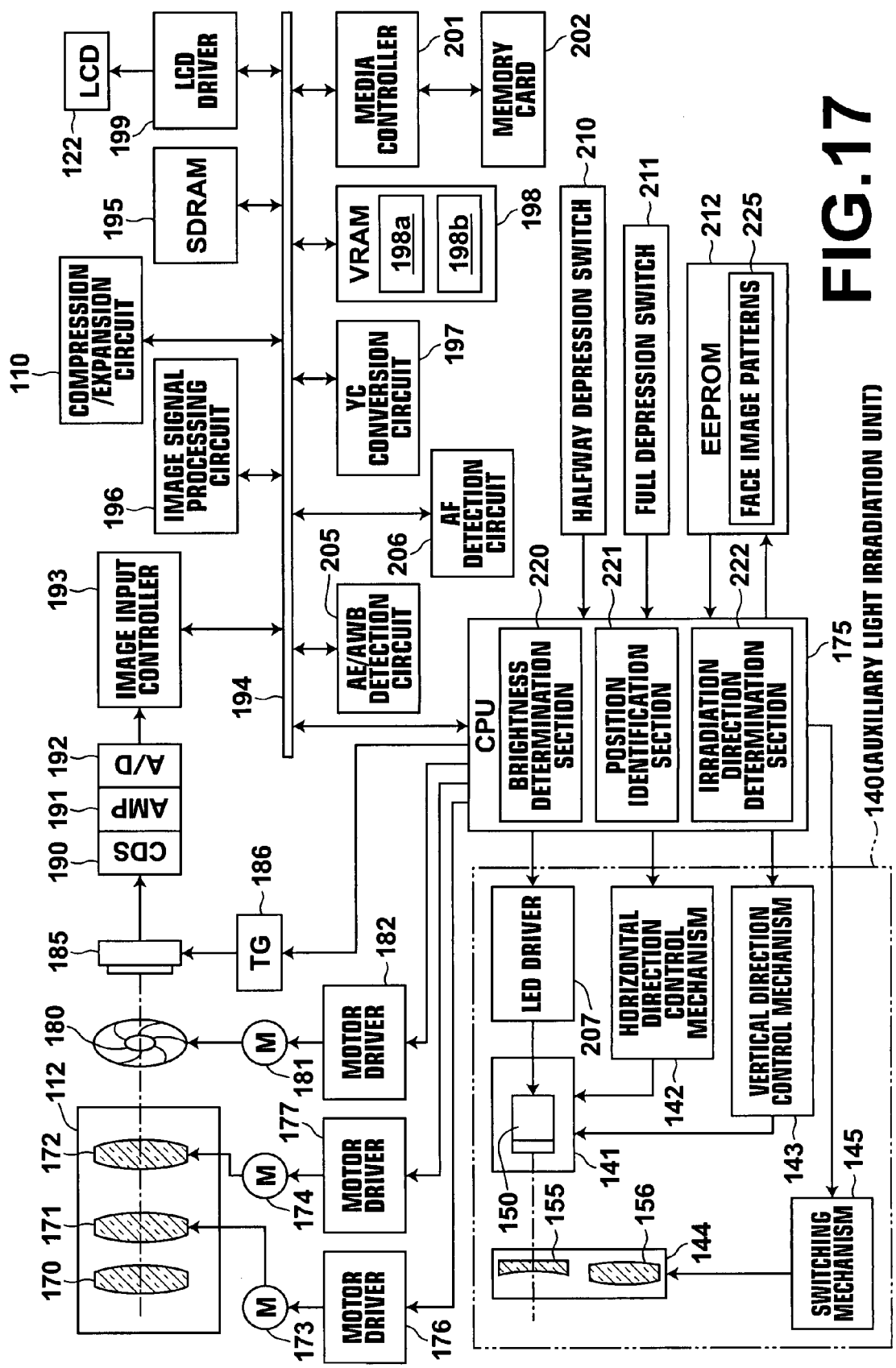
FIG. 17 is a block diagram of the digital camera shown in FIG. 13, illustrating the electrical configuration thereof.

In FIG. 17 that illustrates the electrical configuration of the digital camera 100, the taking lens 112 includes a fixed lens 170, a zoom lens 171, and focus lens 172. Lens motors 173, 174 are connected to the zoom lens 171 and focus lens 172 respectively. The lens motor 173 moves the zoom lens to the wide or telescope side in association with the operation of the zoom operation button 124. The lens motor 174 moves the focus lens 172 according to the variable power of the zoom lens 171 and the like to control the focus such that the photographing conditions become optimal. The lens motors 173, 174 are stepping motors, and operation controlled by drive pulses sent from motor drivers 176, 177, connected to a CPU 175, respectively.

An iris motor 181 is connected to an aperture diaphragm 180. The iris motor is a stepping motor, and operation controlled by a drive pulse sent from a motor driver 182 connected to the CPU 175. This controls the aperture of the aperture diaphragm 180 and the exposure is controlled.

At the back of the taking lens 112, a CCD 185 is provided, which performs a photoelectric conversion on the light transmitted through the taking lens 112 and representing the subject. A timing generator (TG) 186, which is controlled by the CPU 175, is connected to the CCD 185, and the shutter speed of the electronic shutter is determined by the timing signal (clock pulse) inputted from the TG 186.

Image signals outputted from the CCD 185 are inputted to a correlated double sampling circuit (CDS) 190, and outputted as R, G, B image data corresponding accurately to the amount of charges stored in each cell of the CCD 185. The image data outputted from the CDS 190 are amplified by an amplifier (AMP) 191 and converted to digital image data by an A/D converter (A/D) 192.

An image input controller 193 is connected to the CPU 175 through a bus 194, and controls the CCD 185, CDS 190, AMP 191, and A/D 192 according to a control instruction from the CPU 175. The image data outputted from the A/D 192 are tentatively stored in a SDRAM 195.

An image signal processing circuit 196 reads out the image data from the SDRAM 195, then performs various types of image processing, such as gradation conversion, white balance correction, γ correction, and stores the processed image data in the SDRAM 195 again. A YC conversion circuit 197 reads out the image data variously processed by the image signal processing circuit 196 from the SDRAM 195 and converts them into a brightness signal Y and color difference signals Cr, Cb.

A VRAM 198 is a memory for outputting a through image to the LCD 122, and image data passed through the image signal processing circuit 196 and YC conversion circuit 197 are stored therein. In the VRAM 198, memories 198a, 198b corresponding to two frames are provided to allow parallel read/write operations of image data. The image data stored in the VRAM 198 are converted to an analog composite signal by the LCD driver 199 and displayed on the LCD 122 as a through image.

A compression/expansion circuit 110 performs an image compression in a predetermined compression format (e.g., JPEG format). The compressed image data are stored in the memory card 202 through a media controller 201.

An AE/AWB detection circuit 205 that determines whether the exposure amount, i.e., the shutter speed of the electronic shutter and the aperture value of the aperture diaphragm 180 are appropriate for the photographing, and whether the white balance is appropriate for the photographing, and an AF detection circuit 206 that determines whether the focus control of the taking lens is appropriate for the imaging are connected to the bus 194.

The AE/AWB detection circuit 205 calculates the subject brightness from the brightness signal Y and color difference signals Cr, Cb of the image data YC converted by the YC conversion circuit 197. Thereby, it determines whether the combination of the shutter speed and aperture value is appropriate for the photographing and at the same time determines the appropriateness of the white balance, and sends the detection results to the CPU 175. The CPU 175 controls the operations of the taking lens 112, aperture diaphragm 180, and CCD 185 based on the detection results sent from the AE/AWB detection circuit 205. Further, the CPU 175 controls the operation of the auxiliary light irradiation unit 140. The reference numeral 207 denotes a LED driver.

AF detection circuit 206 calculates a focus evaluation value representing the sharpness of the image from the image data digitized by the A/D 192, and sends the calculation results to the CPU 175. For example, when a human or animal face portion is identified from the subject image, the focus evaluation value is obtained by performing a contour extraction process on the image data corresponding to the face region of the human or animal face portion and the region adjacent to the face region using a bandpass filter or the like, and summing extracted contour signals and brightness values of the image data corresponding to the face region and the region adjacent to the face region.

When a human or animal face portion is not identified, the focus evaluation value may be obtained by performing a contour extraction process on the image data corresponding, for example, to the central portion of the photographing field angle, and summing extracted contour signals and brightness values of the image data corresponding to the central portion. Here, a greater focus evaluation value implies that the portion thereof has more high-frequency components and in in-focus state.

In the preparatory processing for photographing initiated by a halfway depression of the release button 130, the CPU (focus control unit) 175 determines the search range of the in-focus position of the focus lens 172 based on the position of the zoom lens at that time, controls the operation of the lens motor 174 through the motor driver 177 to move the focus lens 172, for example, from near side to far side within the search range, compares the focus evaluation values sequentially sent from the AF detection circuit 206, and stops the focus lens 172 at a position where the focus evaluation value becomes maximum, i.e., the in-focus position. In this way, the focus of the taking lens 112 is controlled.

An EEPROM 212 is connected to the CPU 175 in addition to a halfway depression switch 210 and a full depression switch 211. The halfway depression switch 210 is switched on when the release button 130 is depressed halfway, and outputs an on-signal to the CPU 175. In response to this, the CPU 175 performs the preparatory processing for photographing described above. The full depression switch 211 is switched on when the release button 130 is fully depressed, and outputs an on-signal to the CPU 175. In response to the on-signal, the photographing is performed.

The CPU 175 functions as a brightness determination section 220, a position identification section (face image position identification unit, eye position identification unit) 221, and an irradiation direction determination section 222 by reading out various control programs and setting data from the EEPROM 212.

The brightness determination section 220 performs a comparative determination using a calculated value T of the subject brightness outputted from AE/AWB detection circuit 205, and predetermined first and second reference values T1 and T2 (T1>T2). For example, if the calculated value T of the subject brightness exceeds the first reference value T1 (T>T1), it is determined that the digital camera is under photographing conditions in which the AF operation may be performed without irradiating the AF auxiliary light onto the subject.

If the calculated value T of the subject brightness is below or equal to the first reference value T1 and exceeds the second reference value T2 (T2<T≦T1), it is determined that the digital camera is under the photographing conditions in which the AF auxiliary light is not required for the position extraction operation by the position identification section 221, but the AF auxiliary light is required to be irradiated onto the subject when the AF operation is performed. If the calculated value T of the subject brightness is below or equal to the second reference value T2 (T≦T2), it is determined that the digital camera is under the photographing conditions in which the AF auxiliary light is required to be irradiated onto the subject for the position extraction operation by the position identification section 221 and AF operation. It is noted that the first and second reference values T1 and T2 are values obtained by experiments and the like.

The position identification section 221 is activated when the calculated value T of the subject brightness is below or equal to the first reference value T1. Here, the description will be made on the assumption that an image based on the image data stored in the SDRAM 195 is a subject image. The position identification section 221 identifies the position or orientation of a human or animal face portion in the subject image. As for the method for identifying the position or orientation of the face portion, a so-called pattern recognition method in which a plurality of face image patterns (225) having different face orientations is stored in the EEPROM 212 in advance, and the face image patterns are matched with the subject image, a method in which the color of each pixel of the subject image is checked to see if it is a color belonging to a flesh color range, and an area including a number of pixels with colors belonging to the flesh color range which is greater than or equal to a predetermined number of pixels is extracted as the face image, or the like may be employed. For example, if the position or orientation of the human or animal face portion is identified by the position identification section 221, the position of an eye is further identified. It is noted that the pattern recognition method described above may be used for this purpose.

Figure 18:
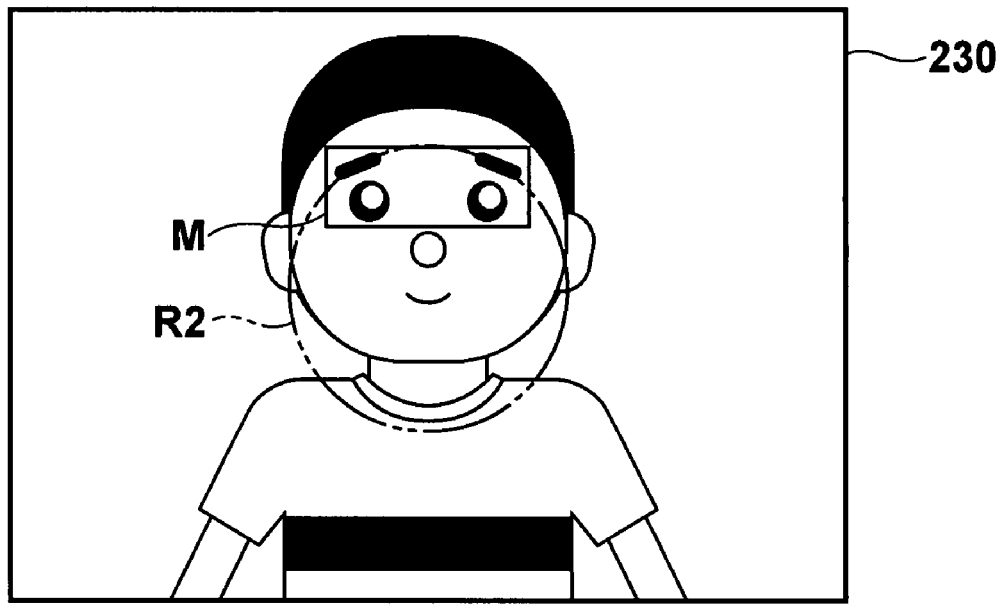
FIG. 18 illustrates the positional relationship between the irradiation range and a subject when the irradiation range of narrow-angle auxiliary light is positioned at the center of the subject image.
Figure 19:
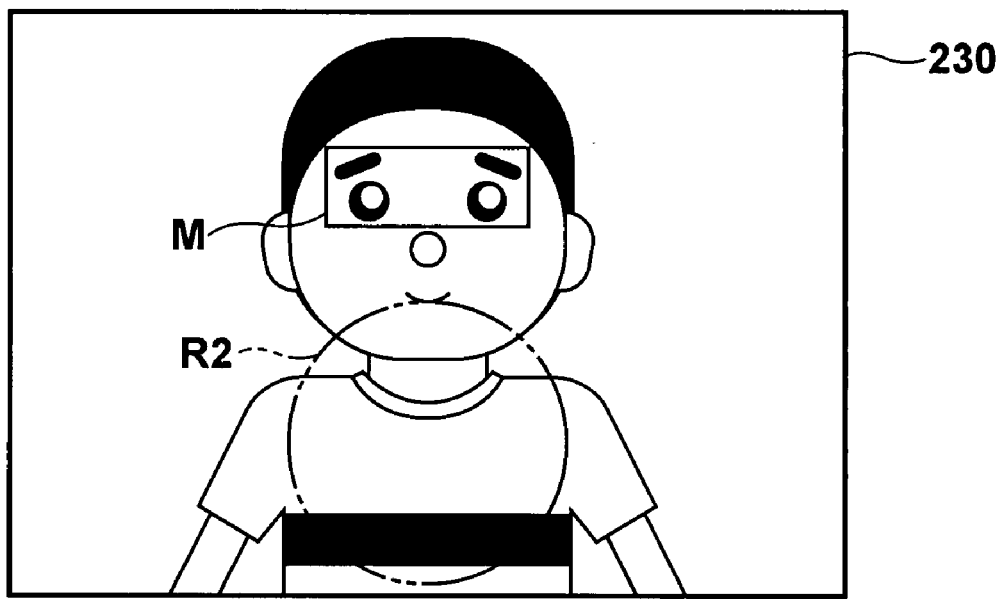
FIG. 19 illustrates the positional relationship between the irradiation range and a subject when the irradiation direction of the narrow-angle auxiliary light is controlled.

The irradiation direction determination section 222 determines the irradiation direction of the narrow-angle auxiliary light S2 to be irradiated onto the subject when the AF operation is performed. For example, since the position of the eye is identified by the position identification section 221, the amount of movement of the LED 150 is determined such that the position of the eye is placed out of the irradiation range of the narrow-angle auxiliary light S2. As illustrated in FIG. 18, when the position of the face portion of a person is identified in a subject image 230, the focus of the taking lens 112 is adjusted to the person. For example, when the emission section 141 is in the reference position, the eye region M of the person is included in the irradiation range R2 of the narrow-angle auxiliary light S2, so that the position of the emission section 141 is controlled such that the narrow-angle auxiliary light S2 is irradiated onto the chest portion of the person, as illustrated in FIG. 19. In the mean time, if the face portion of a person is not identified, the moving amount of the emission section 141 is determined such that the irradiation range R2 of the narrow-angle auxiliary light S2 corresponds to the center of the subject image 230. That is, the moving amount of the emission section 141 is zero in such a case, since the emission section 141 is in the reference position.

Figure 20:
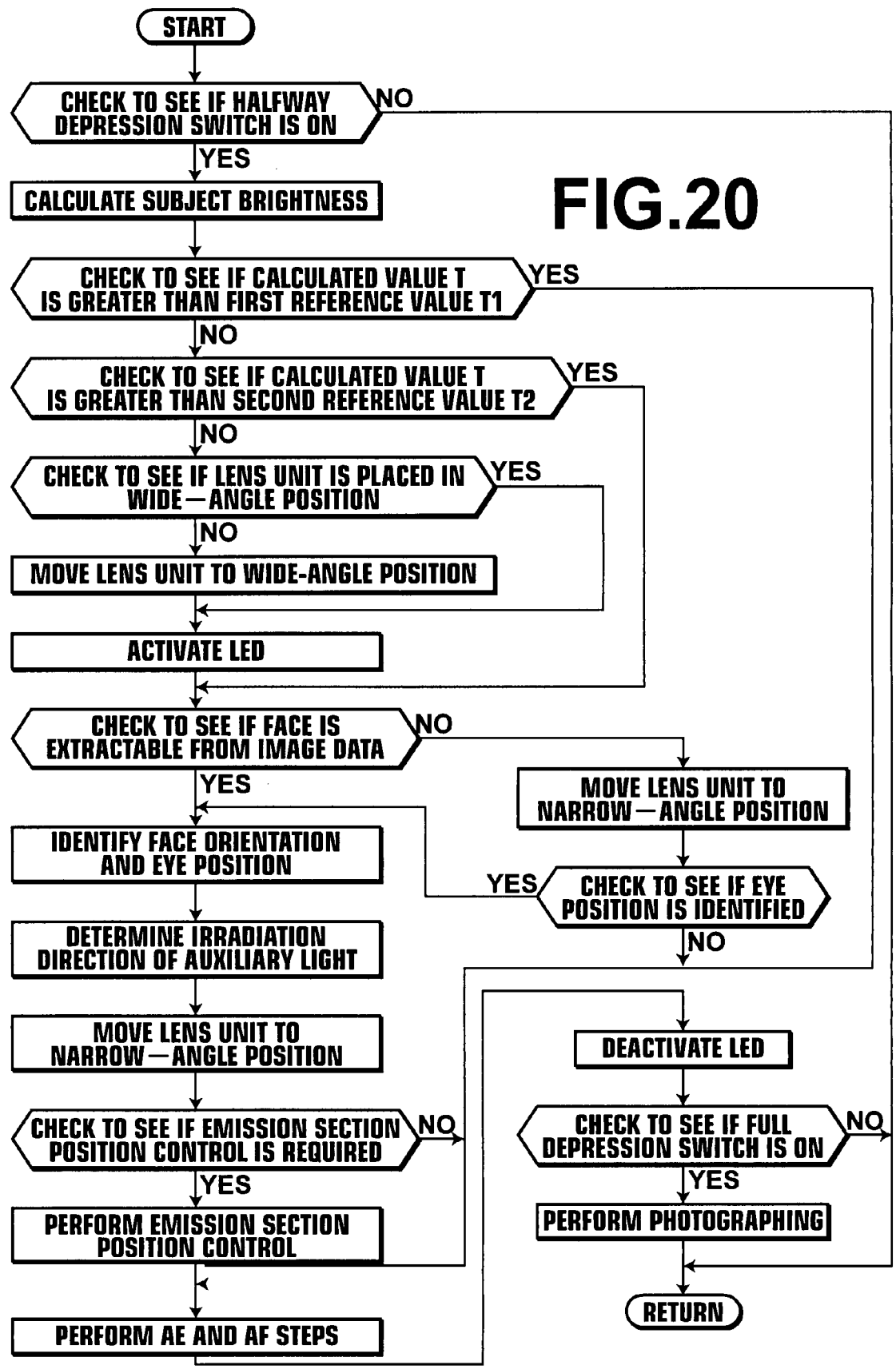
FIG. 20 a flowchart illustrating a process of the digital camera shown in FIG. 13 when photographing.

Next, an operation of the present embodiment will be described based on the flowchart shown in FIG. 20. When the release button 112 is depressed halfway, subject brightness is calculated in the AE/AWB detection circuit 205 from a subject image captured by the CCD 185. A calculated value T of the subject brightness is outputted to the CPU 175.

The CPU 175 performs a comparative determination using the inputted calculated value T of the subject brightness, the first reference value T1, and the second reference value T2. For example, if the calculated value T of the subject brightness is T≦T2, the CPU 175 determines whether the lens unit 144 is in the wide-angle position. If it is determined that the lens unit 144 is in the narrow-angle position, the lens unit 144 is moved to the wide-angle position. Thereafter, the CPU 175 performs emission control of the LED 150 through the LED driver 207. This causes the wide-angle auxiliary light S1 to be irradiated onto the subject. Then using a subject image obtained after the wide-angle auxiliary light S1 is irradiated onto the subject, the position or orientation of a human or animal face portion, and further the position of an eye are identified.

Then, if the position of a human or animal eye is identified from the subject image, the moving amount of the emission section 141 is determined based on the identified position of the eye and irradiation range of the narrow-angle auxiliary light S2 when the emission section 141 is in the reference position. At the same time, the CPU 175 activates the moving mechanism 145 to move the lens unit 144 to the narrow-angle position. Further, the CPU 175 activates the horizontal direction control mechanism 142 and vertical direction control mechanism 143 to control the position of the emission section 141 based on the determined moving amount. After these operations, the CPU 175 causes, through the LED driver 207, the LED 150 to emit light. This results in the narrow-angle auxiliary light S2 to be irradiated onto the subject.

For example, as illustrated in FIG. 18, if the person is located in the center of the subject image 230, the eye region M is also located in the approximate center. For example, when the emission section 141 is in the reference position, the eye region M is located within the irradiation range R2 of the narrow-angle auxiliary light S2. By controlling the position of the emission section 141 such that the irradiation range R2 of the narrow-angle auxiliary light S2 is changed to the chest portion of the subject, as illustrated in FIG. 19, the narrow-angle auxiliary light is prevented from entering the eye of the subject during the AF and AE operations, and the person is prevented from feeling dazzled. The same applies when the subject person is not located in the center of the subject image 230. In this way, by identifying the position of a person, irradiation direction of the narrow-angle auxiliary light S2 may be determined appropriately.

When the narrow-angle light S2 is irradiated, AE and AF operations are performed. After these operations, if the release button 130 is depressed fully, the LED 150 is switched off and photographing is performed. It is noted, in this case, that flash light is irradiated onto the subject when the release button 130 is fully depressed, since the calculated value T of the subject brightness is below the first reference value T1. When the flash light is irradiated, for example, the AE and AE operations are performed again, and the photographing is performed using the newly calculated shutter speed and aperture value.

In the mean time, there may be a case in which the position of the face portion of a person is not identified from the subject image when the wide-angle auxiliary light S1 is irradiated. In this case, the position control of the emission section 141 is not performed, since the emission section 141 is in the reference position. Then, after the narrow-angle auxiliary light S2 is irradiated onto the subject through switch-on control for the LED 150, the AE and AF operations are performed. After these operations, when the release button 130 is depressed fully, the LED 150 is switched off and photographing is performed. In this way, even when a person is not present, i.e., when photographing a landscape, the AF operation may be performed appropriately with respect to a subject located in the central portion of the field angle.

It is noted that the processes for identifying the position and orientation of the face portion of a person in a subject image, and further for identifying the eye position, are performed also during the AE and AF operations. For example, if the position or orientation of the face portion of the person is identified, the moving amount of the emission section 141 is determined such that the newly identified eye position of the person is not included in the irradiation range of the narrow-angle auxiliary light S2 and the narrow-angle auxiliary light S2 is irradiated onto the chest portion of the person. Then, after the position of the emission section 141 is controlled based on the determined moving amount, the AE and AF operations are performed. After these operations, if the release button 130 is depressed fully, the LED 150 is switched off and photographing is performed. In this way, even if a person is newly identified from the subject image, the AF operation may be performed appropriately.

Further, when the calculated value T of the subject brightness is, $T2<T\leq T1$, the position and orientation of a human or animal face portion, and further the eye position are identified without irradiating the wide-angle auxiliary light S1 onto the subject. Thereafter, the position of the emission section 141 is controlled such that the identified eye position is not included in the irradiation range of the narrow-angle auxiliary light, and then the narrow-angle auxiliary light is irradiated onto the subject, as in the case of $T\leq T2$. Under this state, the AE and AF operations are performed. After these operations, if the release button 130 is depressed fully, the LED 150 is switched off and photographing is performed.

If the calculated value T of the subject brightness is, $T1<T$, the AE and AF operations are performed without activating the auxiliary light irradiation unit 140, since $T1<T$ is a photographing condition that allows the AF operation without the AF auxiliary light being irradiated onto the subject. After these operations, if the release button 130 is depressed fully, the LED 150 is switched off and photographing is performed.

In the present embodiment, the description has been made of a case in which the subject image includes a single person. If a plurality of persons is included in the subject image, for example, a plurality of positions of the face portions and eye positions of the persons are identified. In this case, for example, the number of pixels of each of the face portions is calculated to determine a person having a large face portion as the main subject, then the position of the emission section is controlled such that the eye position of the main subject person is not included in the irradiation range of the narrow-angle auxiliary light. Alternatively, the position of the emission section may be controlled such that the eyes of the identified plurality of persons are not included in the irradiation range of the narrow-angle auxiliary light.

In the present embodiment, the AF auxiliary light includes wide-angle auxiliary light which is irradiated onto a subject when identifying the position and orientation of the face portion, and further the eye position of the subject, and narrow-angle auxiliary light which is irradiated onto the subject when performing focus control of the taking lens. But the structure of the AF auxiliary light is not limited to this, and the AF auxiliary light may be constituted only by the narrow-angle auxiliary light.

In the present embodiment, the position of the emission section is controlled such that the irradiation range of the narrow-angle auxiliary light is changed to the chest portion of a person, but it is not limited to this since all that is required is to control the position of the emission section such that the eye position of a person is not included in the irradiation range of the narrow-angle auxiliary light. For example, the position of the emission section may be controlled such that the irradiation range of the narrow-angle auxiliary light corresponds to a range from the chin to a chest portion, a head area, or a lower half face including the mouth and nose of the person.

In the present embodiment, if the position or orientation of a human or animal face portion is not identified from a subject image, the irradiation range of the narrow-angle auxiliary light is set to the central area of the subject image, but it is not limited to this, and the irradiation range may be set arbitrarily.

In the present embodiment, the moving amount of the emission section is determined such that the eye position identified from a subject image is not included in the irradiation range of the narrow-angle auxiliary light, and the position of the emission section is controlled based on the determined moving amount, but it is not limited to this. For example, the position of the emission section may be controlled while detecting the irradiation range of the narrow-angle auxiliary light being irradiated onto a subject. That is, in a subject image captured by the CCD, a high subject brightness region may be identified as the irradiation range of the narrow-angle auxiliary light, and the position of the emission section may be controlled such that the identified eye position is not included in the irradiation range of the narrow-angle auxiliary light.

In the present embodiment, the wide-angle auxiliary light and narrow-angle auxiliary light are irradiated onto a subject by switching between the wide-angle lens and narrow-angle lens. But the method for irradiating the wide-angle auxiliary light and narrow-angle auxiliary light is not limited to this. For example, it is possible to irradiate auxiliary light from a light source onto a subject as the wide-angle auxiliary light or narrow-angle auxiliary light by moving a lens disposed between the light source and the subject in the optical directions of the lens. Hereinafter, such an embodiment will be described, in which components identical to those of the present embodiment are given the same reference symbols.

Figure 21:
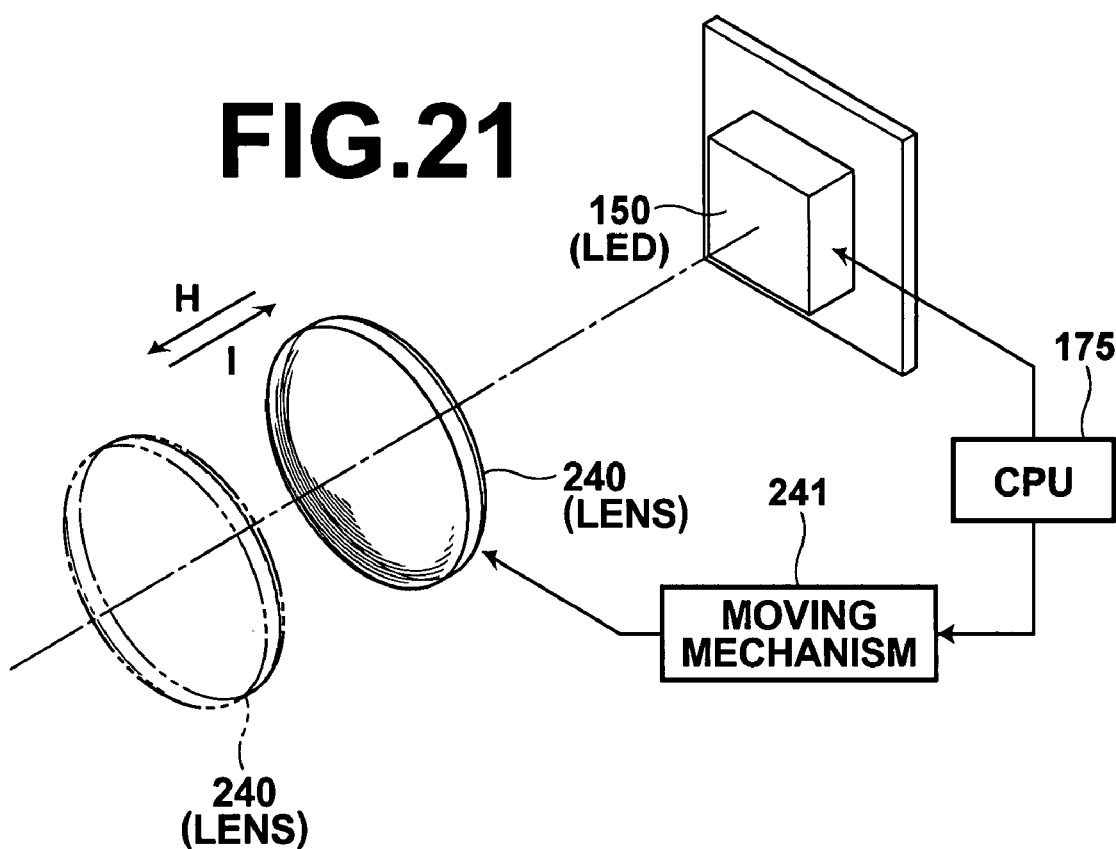
FIG. 21 is a perspective view of a configuration for switching the auxiliary light between narrow-angle auxiliary light and wide-angle auxiliary light by moving the lenses in the optical axis directions.

As illustrated in FIG. 21, an illumination lens 240 is disposed in front of the LED 150. The lens 240 is movable in the optical axis directions of the lens 240 (H or I direction) by a moving mechanism 241. It is moved between the wide-angle position (position indicated by a solid line in FIG. 21) for irradiating wide-angle auxiliary light and the narrow-angle position (position indicated by a chain double-dashed line in FIG. 21) for irradiating narrow-angle auxiliary light. In this way, the wide-angle auxiliary light and narrow-angle auxiliary light may be used by switching them without using wide-angle and narrow angle lenses. Although not illustrated in FIG. 21, when changing the irradiation direction of the auxiliary light, either the LED 150 or the lens 240 is moved on a plane orthogonal to the photographing optical axis. It is noted that the LED 150 may be moved in the photographing optical axis directions instead of moving the lens 240 in the optical directions thereof, or each of the lens 240 and LED 150 may be moved in the photographing optical axis directions.

Figure 22:
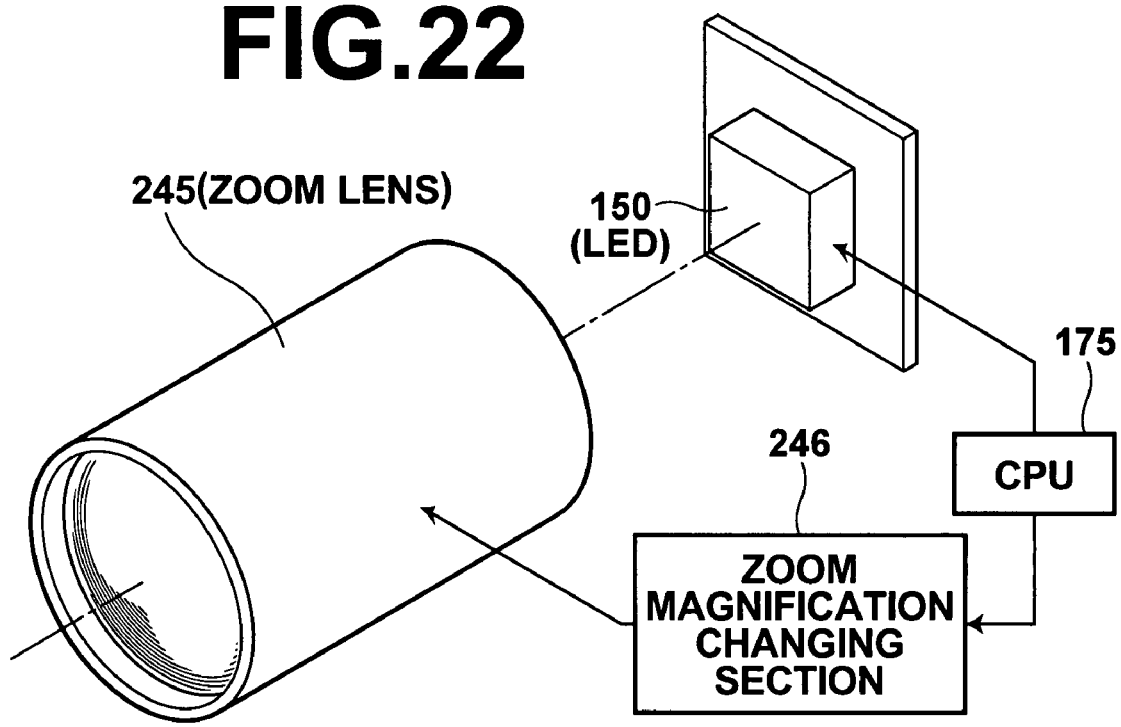
FIG. 22 is a perspective view of a configuration for switching the auxiliary light between narrow-angle auxiliary light and wide-angle auxiliary light using a zoom lens.

Further, it is also possible to switch between the narrow-angle auxiliary light and wide-angle auxiliary light using a zoom lens. As illustrated in FIG. 22, a zoom lens 245 is provided in front of the LED 150. In addition, a zoom magnification changing section 246 is also provided. The zoom magnification changing section 246 switches between the narrow-angle auxiliary light and wide-angle auxiliary light by increasing the zoom magnification of the zoom lens 245 when irradiating the narrow-angle auxiliary light, and decreasing the zoom magnification when irradiating the wide-angle auxiliary light. Although not illustrated in FIG. 22, when changing the irradiation direction of the auxiliary light, either the emission section 141 or the zoom lens 245 is moved on a plane orthogonal to the photographing optical axis.

In the present embodiment, the irradiation direction of the narrow-angle auxiliary light is changed by controlling the position of the emission section, but it is not limited to this. The irradiation direction of the narrow-angle auxiliary light may also be changed by controlling the position of the narrow-angle lens on a plane orthogonal to the photographing optical axis, or by controlling the position of each of the narrow-angle lens and emission section on a plane orthogonal to the photographing optical axis.

In the present embodiment, the description has been made of a case in which a still image is captured, but the present invention is not limited to this. The invention may also be used when a motion image is captured, other than the still image.

It will be appreciated that the photographing apparatus of the present invention is not limited to the digital cameras according to the embodiments described above, and various design changes may be made without departing from the scope of the present invention.

What is claimed is:

1. A photographing apparatus in which subject image light is inputted to an image sensor through a taking lens, and image signals obtained through photoelectric conversion by the image sensor are stored after being converted to digital data, the apparatus comprising:

a face image position identification unit for detecting a human or animal face image within the subject image based on the digital data, and identifying the position of the face image;

an eye position identification unit for identifying an eye position from the face image identified by the face image position identification unit;

an auxiliary light irradiation unit for irradiating narrow-angle auxiliary light onto a position within an area including the face image identified by the face image position identification unit other than the eye position; and a focus control unit for controlling the focus of the taking lens by identifying the in-focus position based on the digital data of the area including the face image, wherein the auxiliary light irradiation unit includes: a light source which is activated when controlling the focus of the taking lens;

a narrow-angle lens for turning the light from the light source into narrow-angle auxiliary light;

an irradiation direction control section for controlling the irradiation direction of the narrow-angle auxiliary light by moving either the light source or the narrow-angle lens on a plane substantially orthogonal to the photographing optical axis;

the auxiliary light irradiation unit includes an auxiliary light irradiation angle changing section for changing the irradiation angle of the light from the light source to turn the light into wide-angle auxiliary light; and the wide-angle auxiliary light is irradiated onto the subject by the auxiliary light irradiation angle changing section when the face image position identification unit is unable to detect a face image.

2. The photographing apparatus of claim 1, wherein the auxiliary light irradiation angle changing section includes: a wide-angle lens for irradiating the light from the light source onto the subject as the wide-angle auxiliary light; and a lens moving section for selectively positioning the narrow-angle lens or the wide-angle lens on the optical axis of the light source.

3. The photographing apparatus of claim 1, wherein the auxiliary light irradiation angle changing section includes a moving section for moving either the light source or the narrow-angle lens on the photographing optical axis.

4. The photographing apparatus of claim 1, wherein the narrow-angle lens is constituted by a zoom lens, and the auxiliary light irradiation angle changing section is constituted by a zoom magnification changing unit for changing the zoom magnification of the narrow-angle lens.

5. The photographing apparatus of claim 4, wherein when the face image position identification unit is unable to detect a face image while the wide-angle auxiliary light is irradiated by the auxiliary light irradiation unit, the auxiliary light irradiation unit irradiates narrow-angle auxiliary light onto a predetermined position.

6. The photographing apparatus of claim 1, wherein when the face image position identification unit is unable to detect a face image while the wide-angle auxiliary light is irradiated by the auxiliary light irradiation unit, the auxiliary light irradiation unit irradiates narrow-angle auxiliary light onto a predetermined position.

7. The photographing apparatus of claim 6, wherein while the focus control of the taking lens is performed by irradiating narrow-angle auxiliary light by the auxiliary light irradiation unit, the eye position identification unit identifies the eye position, and the irradiation direction of the narrow-angle auxiliary light is changed to avoid the eye position identified by the eye position identification unit.

8. A photographing apparatus in which subject image light is inputted to an image sensor through a taking lens, and image signals obtained through photoelectric conversion by the image sensor are stored after being converted to digital data, the apparatus comprising:
- a face image position identification unit for detecting a human or animal face image within the subject image based on the digital data, and identifying the position of the face image;
- an eye position identification unit for identifying an eye position from the face image identified by the face image position identification unit;
- an auxiliary light irradiation unit for irradiating narrow-angle auxiliary light onto a position within an area including the face image identified by the face image position identification unit other than the eye position; and
- a focus control unit for controlling the focus of the taking lens by identifying the in-focus position based on the digital data of the area including the face image, wherein the auxiliary light irradiation unit includes: a light source which is activated when controlling the focus of the taking lens;
- a narrow-angle lens for turning the light from the light source into narrow-angle auxiliary light;
- an irradiation direction control section for controlling the irradiation direction of the narrow-angle auxiliary light by moving either the light source or the narrow-angle lens on a plane substantially orthogonal to the photographing optical axis; and
- wherein while the focus control of the taking lens is performed by irradiating narrow-angle auxiliary light by the auxiliary light irradiation unit, the eye position identification unit identifies the eye position, and the irradiation direction of the narrow-angle auxiliary light is changed to avoid the eye position identified by the eye position identification unit.

* * * * *